(12) United States Patent
Madsen et al.

(10) Patent No.: US 12,274,958 B2
(45) Date of Patent: Apr. 15, 2025

(54) FILTRATION AND DEAERATION SYSTEM

(71) Applicant: Donaldson Company, Inc., Bloomington, MN (US)

(72) Inventors: Mike J. Madsen, Chaska, MN (US); Michael J. Cronin, Apple Valley, MN (US)

(73) Assignee: Donaldson Company, Inc., Bloomington, MN (US)

( * ) Notice: Subject to any disclaimer, the term of this patent is extended or adjusted under 35 U.S.C. 154(b) by 271 days.

(21) Appl. No.: 17/771,141

(22) PCT Filed: Oct. 23, 2020

(86) PCT No.: PCT/US2020/057084
§ 371 (c)(1),
(2) Date: Apr. 22, 2022

(87) PCT Pub. No.: WO2021/081341
PCT Pub. Date: Apr. 29, 2021

(65) Prior Publication Data
US 2022/0362687 A1 Nov. 17, 2022

Related U.S. Application Data

(60) Provisional application No. 62/924,901, filed on Oct. 23, 2019.

(51) Int. Cl.
*B01D 19/00* (2006.01)
*B01D 29/58* (2006.01)
(Continued)

(52) U.S. Cl.
CPC ......... *B01D 19/0031* (2013.01); *B01D 29/58* (2013.01); *B01D 36/001* (2013.01);
(Continued)

(58) Field of Classification Search
None
See application file for complete search history.

(56) References Cited

U.S. PATENT DOCUMENTS 3,112,190 A 11/1963 Topol
3,246,637 A 4/1966 Walsh
(Continued)

FOREIGN PATENT DOCUMENTS

CN 1957068 A 5/2007
CN 1980728 A 6/2007
(Continued)

OTHER PUBLICATIONS

"Hydac Filtertechnik RT Filter Technik: RT Return Line Filter" brochure, Hydac Filtertechnik GmbH, Sulzbach/Saar, Germany, 12 pages. Available as early as Sep. 5, 2018.
(Continued)

*Primary Examiner* — Gabriel E Gitman
(74) *Attorney, Agent, or Firm* — Mueting Raasch Group

(57) ABSTRACT

A deaeration system is disclosed. A preliminary filtration stage is configured to filter particles from and nucleate gas in a fluid stream to create a filtered fluid stream. A primary filtration stage is downstream of the preliminary filtration stage configured to separate the filtered fluid stream into a first liquid stream and an air cavity concentrate stream. A secondary filtration stage is configured to receive the air cavity concentrate stream and separate the air cavity concentrate stream into a second liquid stream and a gas stream.

20 Claims, 7 Drawing Sheets

(51) Int. Cl.
    *B01D 36/00*     (2006.01)
    *B01D 46/24*     (2006.01)

(52) U.S. Cl.
    CPC .......... *B01D 46/24* (2013.01); *B01D 19/0042* (2013.01); *B01D 2201/298* (2013.01)

(56) References Cited

U.S. PATENT DOCUMENTS

| | | |
|---|---|---|
| 3,523,408 A | 8/1970 | David |
| 3,631,654 A | 1/1972 | Riely et al. |
| 4,098,328 A | 7/1978 | Cheong |
| 4,568,367 A | 2/1986 | Gremel et al. |
| 4,572,724 A | 2/1986 | Rosenberg et al. |
| 4,664,682 A | 5/1987 | Monzen |
| 4,787,921 A | 11/1988 | Shibata et al. |
| 4,909,937 A | 3/1990 | Hoffmann et al. |
| 5,162,102 A | 11/1992 | Nogawa et al. |
| 5,362,406 A | 11/1994 | Gsell et al. |
| 5,536,413 A | 7/1996 | Bormann et al. |
| 5,951,862 A | 9/1999 | Bradford |
| 6,017,474 A | 1/2000 | Teo et al. |
| 6,033,462 A | 3/2000 | Dekker et al. |
| 6,096,120 A * | 8/2000 | Erlund ............... B01D 19/0042 96/155 |
| 6,176,904 B1 | 1/2001 | Gupta |
| 6,422,224 B1 | 7/2002 | Walker, Jr. |
| 6,506,340 B1 | 1/2003 | Tsai et al. |
| 6,605,210 B2 | 8/2003 | Reinhardt |
| 7,309,372 B2 | 12/2007 | Kahlbaugh et al. |
| 7,314,497 B2 | 1/2008 | Kahlbaugh et al. |
| 7,531,026 B2 | 5/2009 | Follette et al. |
| 7,926,327 B2 | 4/2011 | Schmidt |
| 8,043,420 B2 | 10/2011 | Konishi et al. |
| 8,057,567 B2 | 11/2011 | Webb et al. |
| 8,118,921 B2 | 2/2012 | Ingvast et al. |
| 8,268,033 B2 | 9/2012 | Rogers et al. |
| 8,277,529 B2 | 10/2012 | Rogers et al. |
| 8,512,435 B2 | 8/2013 | Rogers et al. |
| 8,641,796 B2 | 2/2014 | Rogers et al. |
| 9,518,913 B2 | 12/2016 | Wilhelm |
| 9,782,695 B2 | 10/2017 | Simcina et al. |
| 9,795,906 B2 | 10/2017 | Rogers et al. |
| 2002/0194988 A1 | 12/2002 | Betting et al. |
| 2003/0085165 A1 | 5/2003 | Shane |
| 2004/0262217 A1 | 12/2004 | Mori et al. |
| 2005/0051486 A1 | 3/2005 | Zuk, Jr. |
| 2005/0066812 A1 | 3/2005 | Vesper et al. |
| 2005/0145561 A1 | 7/2005 | Takai et al. |
| 2005/0218074 A1 | 10/2005 | Pollock |
| 2005/0261530 A1 | 11/2005 | Stell et al. |
| 2006/0242933 A1 | 11/2006 | Webb et al. |
| 2007/0084776 A1 | 4/2007 | Sasur |
| 2007/0231233 A1 | 10/2007 | Bose |
| 2009/0020486 A1 | 1/2009 | Barnwell |
| 2010/0122899 A1 | 5/2010 | Hartman et al. |
| 2010/0285297 A1 | 11/2010 | Bansal et al. |
| 2010/0320142 A1 | 12/2010 | Ge et al. |
| 2011/0174158 A1 | 7/2011 | Walls et al. |
| 2012/0097194 A1 | 4/2012 | McDaniel et al. |
| 2012/0234748 A1 | 9/2012 | Little et al. |
| 2012/0318754 A1 | 12/2012 | Cox et al. |
| 2013/0037481 A1 | 2/2013 | Lalouch et al. |
| 2013/0126418 A1 | 5/2013 | Lim |
| 2013/0180401 A1 | 7/2013 | Ren et al. |
| 2013/0269533 A1 | 10/2013 | Rathod et al. |
| 2013/0277297 A1 | 10/2013 | Suzuki et al. |
| 2014/0069874 A1 | 3/2014 | Hubbard |
| 2014/0087088 A1 | 3/2014 | Schmitt et al. |
| 2014/0303050 A1 | 10/2014 | Tomikawa |
| 2014/0326661 A1 | 11/2014 | Madsen et al. |
| 2014/0331626 A1 | 11/2014 | Nagy |
| 2015/0027942 A1 | 1/2015 | Chen et al. |
| 2015/0031124 A1 | 1/2015 | Ward |
| 2015/0122720 A1 | 5/2015 | Boiger |
| 2015/0257357 A1 | 9/2015 | Innings et al. |
| 2015/0283479 A1 | 10/2015 | Perreault et al. |
| 2015/0283487 A1 | 10/2015 | Demmel |
| 2015/0360181 A1 | 12/2015 | Neitzel |
| 2016/0033212 A1 | 2/2016 | Wang |
| 2016/0059167 A1 | 3/2016 | Nagy et al. |
| 2016/0121242 A1 | 5/2016 | Bentlohner et al. |
| 2016/0136554 A1* | 5/2016 | Swaminathan .... B01D 39/1623 55/486 |
| 2016/0279538 A1 | 9/2016 | Kozyuk |
| 2016/0303498 A1 | 10/2016 | Doucouréet al. |
| 2017/0225101 A1 | 8/2017 | Schlichter et al. |
| 2017/0225105 A1 | 8/2017 | Rogers et al. |
| 2017/0340992 A1 | 11/2017 | Okamoto et al. |
| 2018/0104628 A1 | 4/2018 | Taku et al. |
| 2018/0154053 A1 | 6/2018 | Shimada et al. |
| 2018/0160747 A1 | 6/2018 | Epperson et al. |
| 2018/0169551 A1 | 6/2018 | Jaganathan et al. |
| 2018/0236388 A1 | 8/2018 | Harris et al. |
| 2018/0257042 A1 | 9/2018 | Hester et al. |
| 2019/0022559 A1 | 1/2019 | Studer et al. |
| 2019/0126172 A1 | 5/2019 | Cardillo, Jr. et al. |
| 2020/0016518 A1 | 1/2020 | Olschok |
| 2020/0038785 A1 | 2/2020 | Ishizuka |
| 2022/0088505 A1 | 3/2022 | Cronin et al. |

FOREIGN PATENT DOCUMENTS

| | | |
|---|---|---|
| CN | 101791494 | 8/2010 |
| CN | 109097129 | 12/2018 |
| DE | 4017229 | 12/1990 |
| DE | 19717287 | 10/1998 |
| DE | 102014000903 | 7/2015 |
| EP | 0122748 A1 | 10/1984 |
| EP | 0 455 950 | 8/1995 |
| EP | 2 479 553 | 7/2012 |
| EP | 2 138 268 | 11/2016 |
| GB | 2022434 A | 12/1979 |
| JP | 2005-212776 A | 8/2005 |
| JP | 2016-140847 | 8/2016 |
| WO | 93/22029 A1 | 11/1993 |
| WO | 98/17369 | 4/1998 |
| WO | 2014/088882 | 6/2014 |
| WO | 2014/125612 | 8/2014 |
| WO | 2014165560 A2 | 10/2014 |
| WO | 2016/023610 | 2/2016 |
| WO | 2019/032773 | 2/2019 |
| WO | 2020/160014 | 8/2020 |
| WO | 2021/081341 | 4/2021 |
| WO | 2022/015714 | 1/2022 |

OTHER PUBLICATIONS

HYDAC Poster, "Design and optimization of tank systems," BFPA Technical Conference 2018, British Fluid Power Association, Bath, United Kingdom, Sep. 10-11, 2018, 1 page.

International Patent Application No. PCT/US2020/015449 filed Jan. 28, 2020; PCT International Preliminary Report on Patentability issued Jul. 27, 2021, 9 pages.

International Patent Application No. PCT/US2020/015449 filed Jan. 28, 2020; PCT International Search Report and Written Opinion, mailed Jul. 2, 2020; 14 pages.

International Patent Application No. PCT/US2020/015449 filed Jan. 28, 2020; PCT Invitation to Pay Additional Fees, issued Apr. 15, 2020; 10 pages.

International Patent Application No. PCT/US2020/057084, filed Oct. 23, 2020, International Preliminary Report on Patentability, issued Apr. 26, 2022, 10 pages.

International Patent Application No. PCT/US2020/057084, filed Oct. 23, 2020, International Search Report and Written Opinion, mailed Mar. 25, 2021, 15 pages.

International Patent Application No. PCT/US2020/057084, filed Oct. 23, 2020, Invitation to Pay Additional Fees and Partial Search Report, mailed Feb. 4, 2021, 11 pages.

International Patent Application No. PCT/US2021/041404, filed Jul. 13, 2021, International Preliminary Report on Patentability, issued Jan. 17, 2023, 9 pages.

(56) References Cited

OTHER PUBLICATIONS

International PCT Application No. PCT/US2021/041404 filed Jul. 13, 2021, PCT International Search Report and Written Opinion, issued Sep. 28, 2021, 13 pages.
Otsu, "A Threshold Selection Method from Gray-Level Histograms", Jan. 1979, IEEE Transactions on Systems, Man, and Cybernetics; vol. SMC-9, No. 1, pp. 62-66.

* cited by examiner

FILTRATION AND DEAERATION SYSTEM

CROSS REFERENCE TO RELATED APPLICATION

This application is the § 371 U.S. National Stage of International Application No. PCT/US2020/057084, filed 23 Oct. 2020, which claims the benefit of U.S. Provisional Application No. 62/924,901, filed 23 Oct. 2019, the disclosures of which are incorporated by reference herein in their entireties.

TECHNOLOGICAL FIELD

The present disclosure is generally related to filters and deaerators. More particularly, the present disclosure is related to a filtration and deaeration system.

BACKGROUND

Various systems that utilize fluids can benefit from removal of air/gas from the fluid (e.g., deaeration). In particular, systems where the same fluid remains within the system for a length of time can experience air/gas buildup in the fluid. For example, systems where the fluid circulates through the system multiple times, such as hydraulic systems, can experience air buildup in the fluid, causing the performance of the system to suffer.

Hydraulic systems, and specifically hydraulic machines, rely on hydraulic fluid to perform work. Common examples of hydraulic systems include hydraulic machines, hydraulic drive systems, hydraulic transmission systems, hydraulic brakes, etc. Because the hydraulic fluid typically remains in the system for a length of time and goes through periods of high pressure and low pressure, air can build up in the fluid. Air in the fluid can be present in various forms, including dissolved air and free air. Free air can include entrained air and foam. The presence of air can cause pump cavitation with symptoms like component wear and increased noise, or a decrease in the fluid bulk modulus, resulting in reduced efficiency of the hydraulic system and reduced controllability. Furthermore, smaller tanks can exacerbate issues with air in the hydraulic fluid (e.g., oil) due to shorter residence times of the fluid in the tank. A short residence time may not allow air in the fluid to leave the fluid before the fluid is again drawn out of the tank.

SUMMARY

Some embodiments of the current technology relate to a deaeration system. A primary filter element has primary filter media extending between a first end and a second end, and the primary filter media has an upstream side and a downstream side. A housing is spaced from the upstream side of the primary filter media to define a primary fluid flow path from the first end towards the second end. The system defines a primary fluid inlet between the first end of the primary filter media and the housing, a primary fluid outlet on the second end of the primary filter media extending outward from the upstream side of the primary filter media, and a primary liquid outlet extending outward from the downstream side of the primary filter media. A secondary filter element has secondary filter media having an upstream surface and a downstream surface. The secondary filter media extends from a third end to a fourth end. The system defines a secondary fluid inlet that is the primary fluid outlet, a secondary liquid outlet that is the downstream surface of the secondary filter media, and a gas outlet on the fourth end. The secondary fluid inlet is towards the third end.

In some such embodiments, the housing tapers towards the second end of the primary filter media. Additionally or alternatively, the first end is configured to be positioned above the second end. Additionally or alternatively, the first end is configured to be positioned below the second end. Additionally or alternatively, the primary filter media lacks a membrane. Additionally or alternatively, the primary filter media has porous barrier media defining a pore size range of 10 µm-200 µm. Additionally or alternatively, the primary filter media is arranged in a tubular configuration, wherein the downstream side defines a central passageway extending from the first end to the second end. Additionally or alternatively, the secondary filter media is arranged in a tubular configuration that defines a cavity, and the primary filter element and the housing are disposed in the cavity.

Additionally or alternatively, the system has a preliminary filtration stage upstream of the primary fluid inlet, where the preliminary filtration stage has a preliminary filter media and defines a preliminary fluid flow path into and through the preliminary filter media to the primary fluid inlet. Additionally or alternatively, the preliminary filter media is positioned vertically above the primary fluid inlet. Additionally or alternatively, fluid flow from the secondary fluid inlet to the secondary liquid outlet is gravity-driven. Additionally or alternatively, the fluid flow path from the secondary fluid inlet to the gas outlet is gravity-driven.

Some embodiments disclosed herein relate to a deaeration system. The deaeration system has a preliminary filtration stage configured to filter particles from and nucleate gas in a fluid stream to create a filtered fluid stream. A primary filtration stage is downstream of the preliminary filtration stage and is configured to separate the filtered fluid stream into a first liquid stream and an air cavity concentrate stream. A secondary filtration stage is configured to receive the air cavity concentrate stream and separate the air cavity concentrate stream into a second liquid stream and a gas stream.

In some such embodiments, the gas stream is in open communication with the ambient environment. Additionally or alternatively, the secondary filtration stage is a settling tank in open communication with the ambient environment. Additionally or alternatively, the settling tank has an impermeable base and a sidewall constructed of secondary filter media. Additionally or alternatively, the first liquid stream and the second liquid stream are configured to flow into a fluid tank. Additionally or alternatively, the primary filtration stage has primary filter media and the first liquid stream is configured to pass through the primary filter media.

Additionally or alternatively, the air cavity concentrate stream is configured to circumvent the primary filter media. Additionally or alternatively, the primary filter media has an upstream side and a downstream side, and the air cavity concentrate stream is configured to flow along the upstream side. Additionally or alternatively, the primary filter media has a pleated screen. Additionally or alternatively, the air cavity concentrate stream is configured to constitute up to 35% of the filtered fluid stream by volume. Additionally or alternatively, air cavity concentrate stream is configured to constitute at least 5% of the filtered fluid stream by volume.

Some embodiments disclosed herein relate to a method. Particles are filtered and gas cavities are nucleated in a fluid stream to create a filtered and nucleated fluid stream. The filtered and nucleated fluid stream is separated into a first liquid stream and an air cavity concentrate stream. The first liquid stream is directed into a fluid tank and the air cavity concentrate stream is separated into a gas stream and a second liquid stream. The second liquid stream is directed into the fluid tank.

In some such embodiments, separating the air cavity concentrate stream includes directing the air cavity concentrate stream into a settling tank, where the settling tank is under atmospheric pressure. Additionally or alternatively, directing the second liquid stream into the fluid tank is gravity-driven through a sidewall of the settling tank that is constructed of secondary filter media. Additionally or alternatively, separating the gas stream from the air cavity concentrate stream includes the natural release of the gas stream under atmospheric conditions. Additionally or alternatively, separating the air cavity concentrate stream includes directing the air cavity concentrate stream into a settling tank, where the settling tank is under pressure of less than 10 psi.

Additionally or alternatively, separating the filtered and nucleated fluid stream includes passing the filtered and nucleated fluid stream along an upstream surface of a primary filter media. Additionally or alternatively, the first liquid stream passes through the primary filter media. Additionally or alternatively, the air cavity concentrate stream circumvents the primary filter media. Additionally or alternatively, the primary filter media has a pleated screen. Additionally or alternatively, filtering particles and nucleating gas cavities includes passing the fluid stream through a preliminary filter media.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology can be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, can be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

The technology disclosed herein relates to a multiple-stage deaeration system that is configured to deaerate fluid containing emulsified air. In some implementations, the deaeration system can be incorporated in a hydraulic fluid tank. The deaeration system can allow the size of the hydraulic fluid tank to be reduced, enabling more compact hydraulic systems. The deaeration system can incorporate filter media, structures, and adopt configurations consistently with what is described in International Application No. PCT/US2020/015449 (WO 2020/0160014 A1), which is incorporated by reference in its entirety.

Figure 1A:
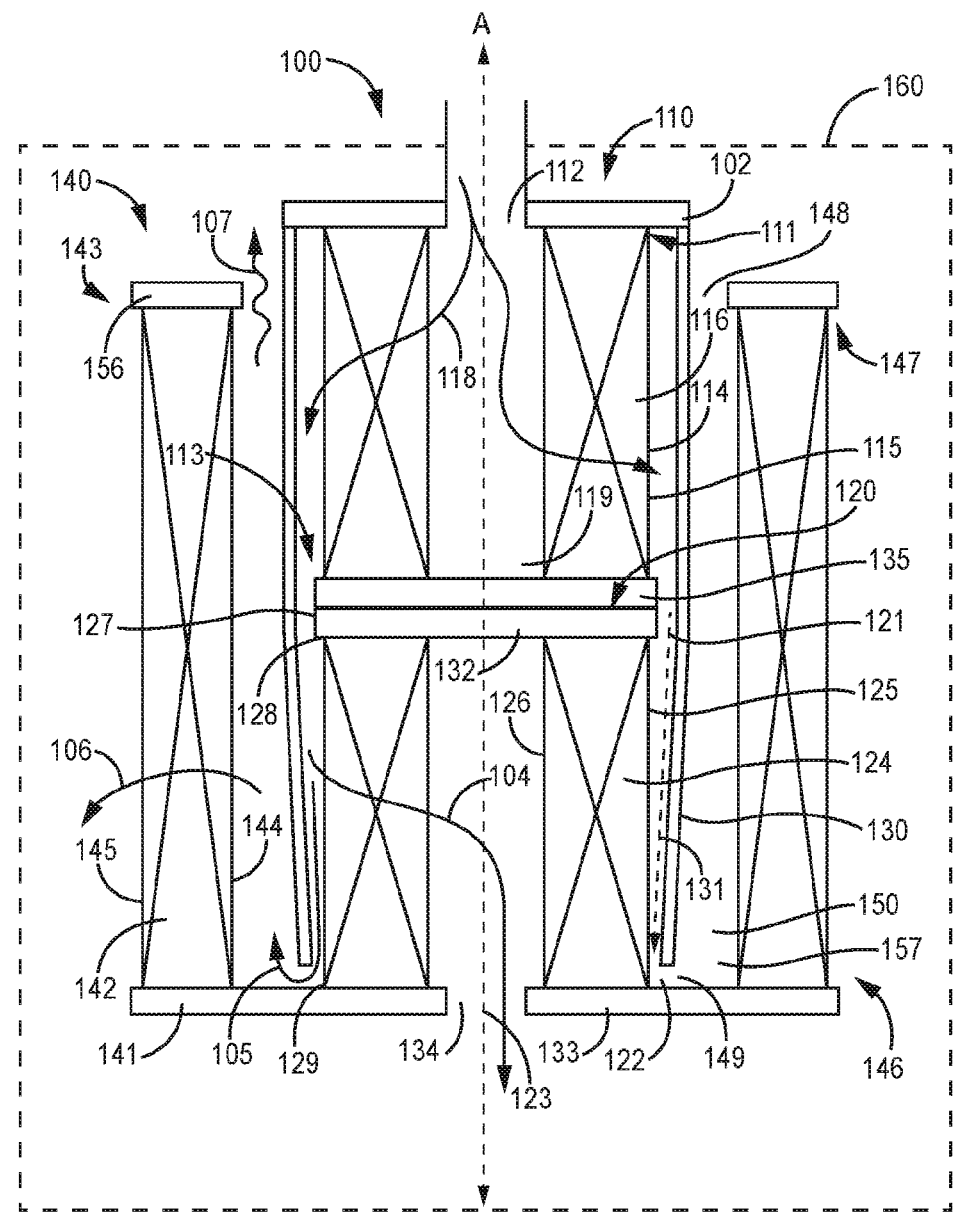
FIG. 1A is an example system consistent with some embodiments.

FIG. 1A is an example deaeration system 100 consistent with various embodiments. The deaeration system 100 is generally configured to remove entrained air from a fluid stream. The deaeration system 100 generally has a preliminary filtration stage 110 (depicted in isolation in FIG. PB), a primary filtration stage 120 (depicted in isolation in FIG. 1C), and a secondary filtration stage 140 (depicted in isolation in FIG. 1D).

Figure 1B:
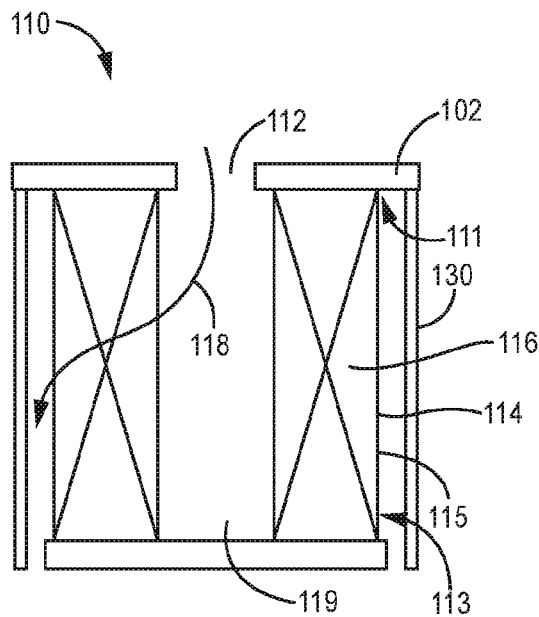
FIG. 1B is an example preliminary stage of the example system of FIG. 1A.
Figure 1C:
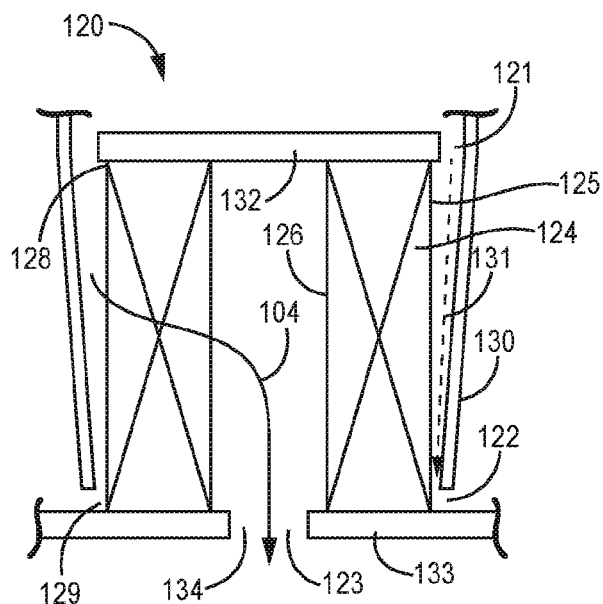
FIG. 1C is an example primary stage of the example system of FIG. 1A.
Figure 1D:
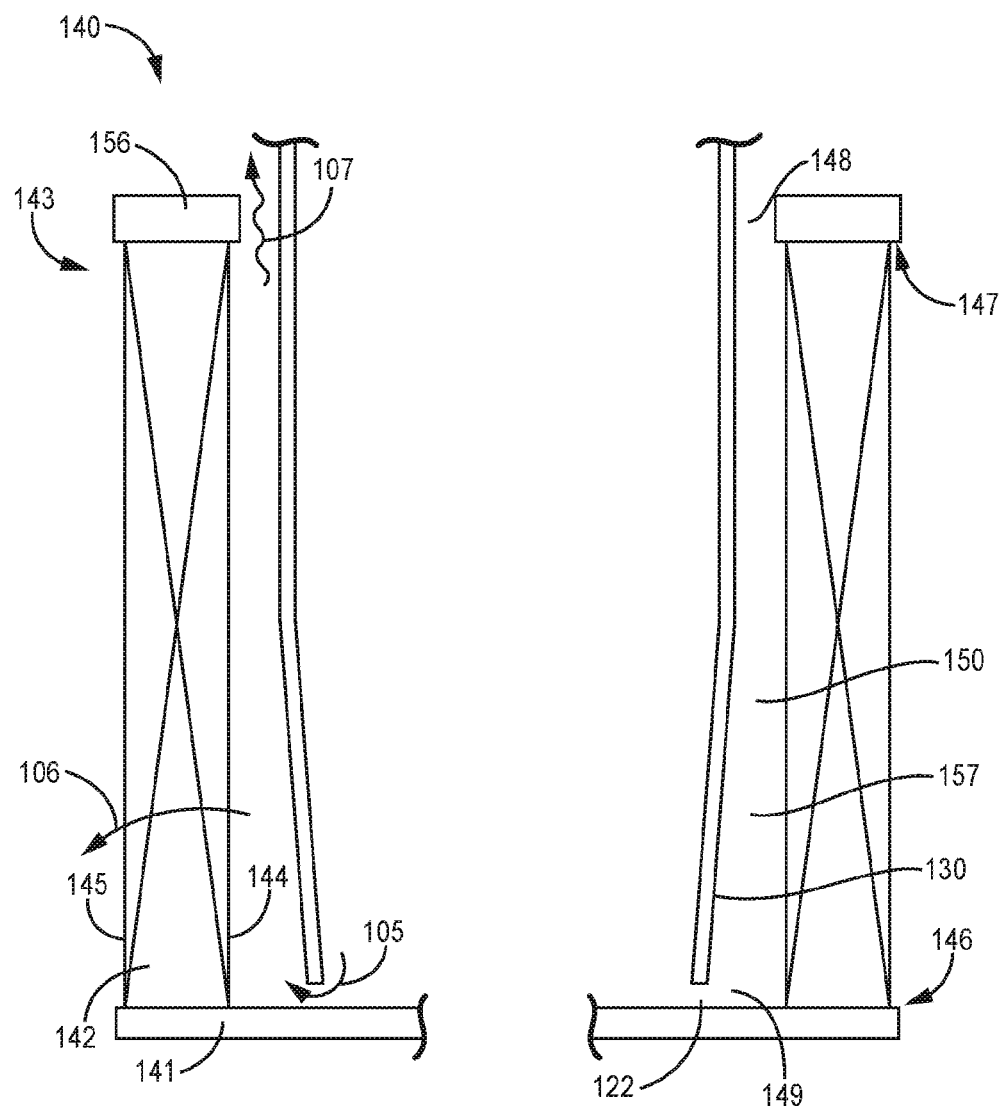
FIG. 1D is an example secondary stage of the example system of FIG. 1A.

Referring to FIGS. 1A and 1B, the preliminary filtration stage 110 is generally configured to filter particles from a fluid stream. The preliminary filtration stage 110 is configured to nucleate gas/air cavities in the fluid stream, where "gas" and "air" are used interchangeably throughout this disclosure. In some embodiments the preliminary filtration stage 110 is also configured to induce coalescence and growth of gas cavities. The preliminary filtration stage 110 has an inlet 112 that receives the fluid stream and an outlet 114 that releases a filtered fluid stream created by the preliminary filtration stage 110.

The preliminary filtration stage 110 has a preliminary filter media 116 and defines a preliminary fluid flow path 118 from the inlet 112 to the outlet 114 and into and through the preliminary filter media 116. In particular, in the current example, the preliminary filtration stage 110 has preliminary filter media 116 surrounding a central opening 119 that is in fluid communication with the inlet 112. A first end structure 102 defines the inlet 112. The first end structure 102 is coupled to a first end 111 of the preliminary filter media 116. A second end structure 135 is coupled to a second end 113 of the preliminary filter media 116 and extends across the central opening 119 such that the fluid stream is directed through the preliminary filter media 116. In the current embodiment, the outlet 114 of the preliminary filter media 116 can be an outer boundary 115 of the preliminary filter media 116.

The preliminary filter media 116 can be constructed of a variety of types of filter media and combinations of filter media. In various embodiments, the preliminary filter media 116 has gas nucleation media, which is now described.

Gas Nucleation Media Construction and Materials

The gas nucleation media can be made of any suitable material that is capable of inducing gas nucleation and filtering particles. Without wishing to be bound by theory, it is believed that multiple aspects of the gas nucleation media affect the effectiveness and efficiency of the media to induce nucleation based on the influence of the aspects on the chemical and physical interactions of the media with the fluid and the gas within the fluid. Aspects that can influence nucleation include, for example, surface area of fibers in the media; accessible surface area; fiber size (e.g., diameter or cross dimension); media pore size; presence of sharp edges or corners; surface roughness; the chemical composition of the media (e.g., fibers and binder); media oleophilicity/oleophobicity; presence and number of fiber intersections; angle of orientation of adjacent fibers; orientation relative to the direction of flow; tortuosity of the flow path; media sheet solidity; media sheet permeability; thickness of media sheet; residence time of the fluid in the media; the Peclet number of the media (e.g., the ratio of advective transfer rate vs. diffusive transfer rate); and differential pressure of the sheet and of individual fibers.

For example, it is believed that media with a suitable (accessible) surface area, fiber size, and media pore size is beneficial to nucleation efficiency. Accessible surface area of the fibers in the media is understood to mean the overall surface area (including surface area inside pores and between fibers) in $m^2$ (meters squared) per bulk surface area of the media sheet in $m^2$, that can be accessed (e.g., contacted) by the fluid. Fiber surface area can be determined using scanning electron microscopy (SEM). The bulk surface area of the media sheet is understood to mean the area calculated as the length times width of the sheet (for pleated media, the pleat height and the number of pleats can be used to calculate the width). The surface area of the gas nucleation media can be 0.1 $m^2$ of fibers/$m^2$ of media, at least 1 $m^2$ of fibers/$m^2$ of media, at least 1.5 $m^2$ of fibers/$m^2$ of media, or at least 2 $m^2$ of fibers/$m^2$ of media. The surface area of the gas nucleation media can be up to 50 $m^2$ of fibers/$m^2$ of media, up to 30 $m^2$ of fibers/$m^2$ of media, up to 10 $m^2$ of fibers/$m^2$ of media, up to 6 $m^2$ of fibers/$m^2$ of media, or up to 4 $m^2$ of fibers/$m^2$ of media.

Fiber size is used here to refer to a diameter or cross dimension of the fibers of the media. The diameter or cross dimension of fibers can be determined optically for larger fibers, and by using SEM for smaller fibers. The fiber size of fibers within the gas nucleation media can vary from fiber to fiber and along a given fiber. The fiber size can also vary from the upstream side of the media to the downstream side of the media along a gradient. The fibers within the gas nucleation media can have a fiber size of at least 10 nm (nanometers), at least 50 nm, or at least 100 nm. The fibers within the gas nucleation media can have a fiber size of up to 500 µm (micrometers), up to 100 µm, or up to 10 µm.

Media pore size of the gas nucleation media is understood to mean the size of individual pores in the media sheet as determined by ASTM F316-03 or ASTM D6767. The pores within the gas nucleation media can have a mean pore size of at least 0.5 µm, at least 1 µm, or at least 5 µm. The pores within the gas nucleation media can have a mean pore size of up to 5 µm, up to 10 µm, up to 20 µm, up to 100 µm, or up to 200 µm. The pores within the gas nucleation media can have a maximum pore size of at least 1 µm, at least 5 µm, or at least 10 µm. The pores within the gas nucleation media can have a maximum pore size of up to 10 µm, up to 20 µm, up to 100 µup to 200 µm.

The chemical composition of the media and the oleophilicity/oleophobicity of the media are believed to impact nucleation. The chemical composition of the media can include the chemical composition of fibers in the media and/or of any binders or other components used in the media. The fibers can include any suitable fibrous material, including woven or non-woven media made from organic or inorganic materials or combinations thereof. The media can include various structures that combine different materials, such as core and sheath structures, side-by-side structures, island in the sea structures, etc. The fibers can include a single material component, or two or more material components within a single fiber, including mixtures of materials. For example, the fibrous material can include one or more of cellulose; regenerated cellulose (e.g., rayon); synthetic materials such as polyamide, polyester, polyethersulfone (PES), polypropylene (PP), polyethylene (PE), polytetrafluoroethylene (PTFE), polyvinylidene difluoride (PVDF); glass; ceramic; or carbon fiber. In one embodiment, the filter media used as the gas nucleation media is made of micro glass and synthetic fibers. Examples of suitable filter media are described in U.S. Pat. Nos. 7,314,497; 7,309,372; 8,057,567; 8,268,033; 8,277,529; 8,512,435; 8,641,796; and 9,795,906, and U.S. Publication Nos. 2012/0234748 and 2017/0225105. The media can include various binders, such as acrylic, phenolic, or epoxy resins.

The gas nucleation media generally has a suitable oleophilicity/oleophobicity to induce nucleation and to release formed gas cavities into the fluid flow (as opposed to being "trapped" onto the surface of the fibers). In one embodiment, the gas nucleation media is oleophobic. Oleophobicity of a material can be expressed as the contact angle of a drop of oil on a single fiber in air and can be measured by dispensing a bubble or oil drop onto fiber and measuring the contact angle, for example using a micro-contact-angle instrument (e.g., MCA-3 instrument available from Kyowa Interface Science Co., Ltd. in Niiza-City, Japan). The gas nucleation media can have a contact angle of at least 30°, at least 50°, at least 70°, at least 90°, or at least 120°. The gas nucleation media can have a contact angle of up to 120°, up to 150°, up to 170°, or up to 180°.

The gas nucleation media can be inherently oleophobic (e.g., made of oleophobic fibers) and/or treated to become oleophobic using, for example, an oleophobic treatment compound. In general, oleophobic materials are fluorochemicals such as fluoropolymers with a high density of terminal CF3 pendent groups exposed at the surface. In certain embodiments, gas nucleation media, or oleophobic treatment compounds (e.g., fluorochemical treatment compounds) applied as surface coatings to the gas nucleation media, can be made from perfluoropolymers such as perfluoroacrylates, perfluorourethanes, perfluoroepoxies, perfluorosilicones, perfluoroalkanes, perfluorodioxolanes, or copolymers of these materials.

While gas nucleation media made from an inherently oleophobic material could be used, typically a fluorochemical treatment compound is coated on a conventional filter media to make it oleophobic. The coating material could be, for example, an oleophobic polymer or another polymer that could be made oleophobic through a multiple step process. Typically, a fluorochemical treatment compound, dissolved or suspended in a liquid carrier (e.g., an organic solvent or water), is applied to a conventional filter media by dipping or spraying.

Exemplary fluoropolymers include perfluoroacrylates dissolved in a solvent, such as those available under the trade names FLUOROPEL Series from Cytonix (Beltsville, MD), SRA 450 or SRA451 from 3M Company (Maplewood, MN), ADVAPEL 806 from Advanced Polymer Incorporated (Carlstadt, NJ); perfluorodioxolanes dissolved in a solvent, such as those available under the trade name TEFLON AF from Chemours (Wilmington, DE); perfluoroacrylate emulsions suspended in water, such as those available under the trade names UNIDYNE from Daikin (Orangeburg, NY), CAPSTONE from Chemours (Wilmington, DE), PHOBOL from Huntsman (The Woodlands, TX), or ADVAPEL 734 from Advanced Polymer Incorporated (Carlstadt, NJ); and perfluorourethanes suspended in water, such as that available under the trade name SRC220 from 3M Company (Maplewood, MN). The gas nucleation media could also be made oleophobic by applying a coating of a fluoropolymer through a plasma polymerization process, such as perfluoroacrylate coatings from P2i (Savannah, GA).

In certain embodiments, the gas nucleation media is prepared by applying a non-oleophobic coating to a conventional filter media, and then modifying it to be oleophobic. For example, a polyalcohol polymer could be applied to a conventional filter media and a perfluorosilane or a perfluoroacyl chloride grafted to this polymer. Alternatively, a polyamine could be applied to a conventional filter media and a perfluoroacrylate grafted to this polymer.

The surface energy of a polymeric material can be determined by preparing a Zisman plot with appropriate fluids, for example according to ASTM D7490-13. The surface energy of materials can also be determined using the Owens-Wendt method. The fibers in the gas nucleation media can have a surface energy of at least 6 mJ/m$^2$ (millijoules per square meter), at least 10 mJ/m$^2$, at least 15 mJ/m$^2$, at least 20 mJ/m$^2$, or at least 40 mJ/m$^2$. The fibers in the gas nucleation media can have a surface energy of up to 400 mJ/m$^2$, up to 300 mJ/m$^2$, up to 200 mJ/m$^2$, up to 150 mJ/m$^2$, up to 100 mJ/m$^2$, or up to 50 mJ/m$^2$.

The geometric configuration of the fibers in the gas nucleation media can impact nucleation. For example, the presence of sharp edges or corners and surface roughness can improve nucleation. The configuration of fiber intersections, the angle of orientation of adjacent fibers, the orientation of the fiber surface relative to the direction of flow, and the tortuosity of the flow path can also impact nucleation. According to some embodiments, the gas nucleation media includes fibers with sharp edges or corners. For example, the fibers can have a cross section that does not have smooth shape (e.g., is not circular or oval). The fiber cross section can be polygonal or have an irregular shape with corners (e.g., corners of less than 180°, less than 120°, or less than 90°). The gas nucleation media includes fibers that have a circular, star-shaped, square, rectangular, trilobal, clover-shaped, or polygonal cross section. The cross section can be constant or varying throughout the length of the fiber.

Surface roughness of a material can be determined as the root mean square roughness using atomic force microscopy (AFM), cross section SEM or transmission electron microscopy (TEM), or surface profilometer. The measurement can be done on a fixed surface area, e.g., a square, having a dimension that is half of the fiber diameter. The fibers of the gas nucleation media can have a surface roughness of at least 1 nm, at least 10 nm, at least 25 nm, at least 50 nm, or at least 100 nm. The fibers of the gas nucleation media can have a surface roughness of up to 1000 nm, up to 500 nm, or up to 200 nm.

Surface roughness can also be characterized using various other parameters, such as skewness, kurtosis, sharpness, etc. The surface features can exhibit a degree of asymmetry (for example, display more steep peaks or deep pits). The asymmetry can be expressed as skewness, measured using AFM, fiber cross section SEM, or a surface profilometer. The skewness of the fibers can be at least −10, at least −8, or at least −6. The skewness of the fibers can be up to 6, up to 8, or up to 10.

Kurtosis is another measure of surface roughness that indicates the degree of pointedness of the sharp features. Kurtosis can be measured using AFM, fiber cross section SEM, or a surface profilometer. The fibers of the gas nucleation media can have a kurtosis of at least −10, at least −8, or at least −6. The fibers of the gas nucleation media can have a kurtosis of up to 6, up to 8, or up to 10. Combinations of certain surface roughness, skewness, and kurtosis can result in favorable nucleation properties. For example, high roughness and high kurtosis can be beneficial to nucleation.

The sharpness or pointedness of surface features can be expressed as the radius of curvature, and be measured using AFM, fiber cross section SEM, or a surface profilometer. The radius of curvature can be up to 2 nm, up to 5 nm, up to 10, up to 50, up to 100, or up to 500 nm.

It is believed that to a certain extent, an increase in the number of fiber intersections can increase nucleation. A fiber intersection is understood to mean a contact point between two fibers. It is further believed that some ranges of angles of orientation of adjacent fibers and the orientation of fibers relative to the direction of flow can be beneficial to nucleation. For example, the fibers within the gas nucleation media can be randomly oriented such that a range of angles of orientation is achieved. In some embodiments, adjacent fibers within the gas nucleation media are not axially aligned with one another.

Aspects that influence the residence time of the fluid in the media or the differential pressure can also impact nucleation. For example, face velocity, media sheet solidity, media sheet permeability, thickness of media sheet, the Peclet number of the media (e.g., the ratio of advective transfer rate vs. diffusive transfer rate), tortuosity of the flow paths within the media, and orientation (e.g., angle) of the media sheet to the primary flow direction can have an impact on nucleation.

The face velocity of the fluid relative to the gas nucleation media sheet can be determined as the volumetric flow per surface area. The face velocity can be at least 0.01 fpm (feet per minute), at least 0.1 fpm, at least 0.5 fpm, at least 1 fpm, at least 5 fpm, or at least 10 fpm. The face velocity can be up to 100 fpm, up to 80 fpm, up to 50 fpm, or up to 25 fpm.

The solidity of a material is the inverse of the void space in the material—how much empty space present in the material. The gas nucleation media sheet can have at least 5%, at least 10%, or at least 20% void space. The gas nucleation media sheet can have up to 98%, up to 90%, up to 75%, up to 50%, up to 40%, or up to 30% void space.

Permeability of a material can be expressed as the Frazier permeability (differential pressure set at 0.5 inch of water or 125 Pa), measured by TAPPI T460, ASTM D737, or DIN 53887. The gas nucleation media sheet can have a permeability of at least 1 ft$^3$/ft$^2$/min (cubic feet per square feet per minute) (8 L/m$^2$/min (liters per square meter per minute)), at least 10 ft$^3$/ft$^2$/min (80 L/m$^2$/min), or at least 50 ft$^3$/ft$^2$/min (400 L/m$^2$/min). The gas nucleation media sheet can have a permeability of up to 500 ft$^3$/ft$^2$/min (4010 L/m$^2$/min), up to 400 ft$^3$/ft$^2$/min (3210 L/m$^2$/min), or up to 300 ft$^3$/ft$^2$/min (2410 L/m$^2$/min).

The gas nucleation media sheet can have an initial, clean differential pressure of at most 0.01 psi, at most 1 psi, or at most 100 psi, per ISO 16889 run at a suitable face velocity.

The Peclet number indicates the ratio of advective to diffusive transport rate of the media, calculated as length (e.g., fiber diameter) times velocity (e.g., face velocity) divided by diffusion coefficient. The gas nucleation media sheet can have a Peclet number of at least 0.05, at least 0.1, at least 0.5, at least 1, or at least 10. The gas nucleation media sheet can have a Peclet number of up to 1000, up to 2500, up to 10,000, or up to 50,000.

The fluid flow path through the gas nucleation media can be tortuous (e.g., be twisted). The calculated average tortuosity, for example hydraulic tortuosity, of the flow paths through the gas nucleation media can be at least 0, at least 0.1, or at least 0.2. The calculated average tortuosity of the flow paths through the gas nucleation media can be up to 4, up to 3, up to 2, up to 1.5, up to 1, up to 0.8, up to 0.9, or up to 1.0.

The angle of the fibers relative to the flow stream can be determined as a weight-average of angle of fibers relative to the direction of flow using, for example, CT scan of the media. The angle can be at least 0° (degrees), at least 10°, or at least 30°. The angle can be up to 90°, up to 80°, or up to 60°.

The rigidity of the fibers in the gas nucleation media can also have an impact on flow properties and thus can impact nucleation. Rigidity can be measured as the flexural modulus of the fibers or the base material, for example according to ASTM D790. For non-polymeric materials, the flexural modulus equals Young's modulus. The fibers of the gas nucleation media can have a flexural modulus of at least 1 GPa (gigapascal), at least 10 GPa, or at least 50 GPa. The fibers of the gas nucleation media can have a flexural modulus of up to 500 GPa, up to 400 GPa, or up to 250 GPa.

The gas nucleation media can have any suitable shape. The shape can be determined based on the positioning of the deaerator in the system. In one embodiment, the gas nucleation media defines a cylindrical shape. The gas nucleation media can have any suitable thickness. The thickness of the gas nucleation media can be measured in the direction of fluid flow. For example, in a cylindrical deaerator, the thickness of the gas nucleation media can be measured in a radial direction perpendicular to a center axis A. The gas nucleation media can have a thickness of at least 0.01 mm, at least 10 mm, or at least 0.1 mm. The gas nucleation media can have a thickness of up to 5 mm, up to 2 mm, or up to 1 mm. The gas nucleation media can be either pleated or wrapped. In either case (pleated or wrapped), the media can have one layer or multiple layers. The media can be repeatedly wrapped or stacked. When multiple layers are included, the layers can have the same composition and/or structure of unique composition and/or structure that can be placed in intimate contact.

Returning to a discussion of the preliminary filter media 116, in embodiments, the preliminary filter media has particulate filter media. The particulate filter media can be a layer of media positioned upstream of the gas nucleation media. In some other embodiments, the preliminary filter media 116 is limited to gas nucleation media that is configured to nucleate gas from a fluid stream. In some such embodiments, the gas nucleation media is also configured to filter particulates from a fluid stream. In some embodiments, the preliminary filter media has multiple layers. In some embodiments, the preliminary filter media is wrapped or stacked. In embodiments, the preliminary filter media is constructed of pleated media. In embodiments, the preliminary filter media is made of non-pleated media.

In some embodiments, the preliminary filter media incorporates growth media layer downstream of the particle filter media and/or gas nucleation media, but in some other embodiments growth media can be omitted. Growth media is described in detail in the section that follows. The layer of growth media can be disposed adjacent the gas nucleation media. The growth media can about (e.g., be in contact with) the gas nucleation media. The growth media can be arranged in the flow path of the fluid such that after flowing through the gas nucleation media, the fluid flows through the growth media. In embodiments consistent with FIG. 1A, the growth media can form a cylinder that is coaxial with and at least partially circumscribes the gas nucleation media.

In some embodiments, the preliminary filter media 116 incorporates a porous barrier media, which is described in detail later in this application with specific reference to the primary filtration stage 120 and the secondary filtration stage 140. The porous barrier media can be a layer of media. The porous barrier media can be the downstream-most layer of the preliminary filter media 116.

Growth Media Construction and Materials

The growth media can be disposed adjacent to or abutting the gas nucleation media. The growth media can be made of any suitable material that is capable of inducing coalescence and/or growth of gas cavities. Without wishing to be bound by theory, it is believed that multiple aspects of the growth media affect the effectiveness and efficiency of the media to induce coalescence. For example, aspects that influence coalescence can include chemical composition of the media (e.g., fibers and binder); surface energy of the media; media oleophilicity/oleophobicity; surface area of the media; media sheet solidity; media sheet porosity; media sheet permeability; thickness of media sheet; surface roughness; and differential pressure across the media. One or more of these properties can exhibit a gradient from the upstream side to the downstream side of the growth media.

The chemical composition of the growth media can impact coalescence and growth. The chemical composition of the growth media can include the chemical composition of fibers in the media and/or of any binders or other components used in the media. The fibers can include any suitable fibrous material, including woven or non-woven media made from one or more of cellulose; regenerated cellulose (e.g., rayon); synthetic materials such as polyamide (e.g., nylon), polyester, polyethersulfone (PES), polypropylene (PP), polyethylene (PE), polytetrafluoroethylene (PTFE), polyvinylidene difluoride (PVDF); glass; ceramic; or carbon fiber. In one embodiment, the growth media is made of or includes polyester, rayon, or a combination thereof. The media can include various binders, such as acrylic, phenolic, or epoxy resins.

Preferably, the growth media has a suitable surface energy and oleophilicity/oleophobicity to induce coalescence and/or growth of gas cavities and to release formed gas cavities into the fluid flow (as opposed to being "trapped" onto the surface of the fibers). According to an embodiment, the growth media is oleophilic. In some embodiments, the growth media exhibits an oleophilicity/oleophobicity gradient, where the upstream side of the media is more oleophobic than the downstream side. In another embodiment, the upstream side is more oleophilic than the downstream side. Oleophobicity of a material can be expressed as the contact angle of a drop of oil on a single fiber in air. The growth media can have a contact angle of at least 0°, at least 10°, at least 20°, or at least 30°. The growth media can have a contact angle of up to 180°, up to 150°, up to 120°, up to 90°, or up to 60°. The growth media can be inherently oleophilic (e.g., made of oleophilic fibers) and/or treated to become oleophilic using, for example, an oleophilic treatment compound.

The fibers in the growth media can have a surface energy of at least 6 $mJ/m^2$, at least 20 $mJ/m^2$, at least 50 $mJ/m^2$, at least 75 $mJ/m^2$, or at least 100 $mJ/m^2$. The fibers in the growth media can have a surface energy of up to 400 $mJ/m^2$, up to 350 $mJ/m^2$, up to 300 $mJ/m^2$, or up to 250 $mJ/m^2$.

The surface area of the media and thus contact area between media and the fluid can impact coalescence and growth. The surface area of the fibers in the media is understood to mean the overall surface area (including surface area between fibers) in $m^2$ per bulk surface area of the media sheet in $m^2$. The surface area of the growth media can be at least 0.1 $m^2$ of fibers/$m^2$ of media, at least at least 1 m² of fibers/m² of media, at least 1.5 m² of fibers/m² of media, or at least 2 m² of fibers/m² of media. The surface area of the growth media can be up to 50 m² of fibers/m² of media, up to 30 m² of fibers/m² of media, up to 10 m² of fibers/m² of media, up to 6 m² of fibers/m² of media, or up to 4 m² of fibers/m² of media.

The geometric configuration of the fibers in the growth media can impact coalescence and growth. For example, the presence of sharp edges or corners and surface roughness, the orientation of fiber surface relative to the direction of flow, the solidity, permeability, and pore size of the growth media can be selected to increase coalescence and growth of gas cavities and to release the gas cavities into the fluid flow after they have grown and/or coalesced.

The fiber cross section of fibers in the growth media can be polygonal or have an irregular shape with corners (e.g., corners of less than 180°, less than 120°, or less than 90°). The growth media can include fibers that have a circular, star-shaped, square, rectangular, tri-lobal, clover-shaped, or polygonal cross section. The cross section can be constant or varying throughout the length of the fiber.

The fiber size of fibers within the growth media can vary from fiber to fiber and along a given fiber. The fiber size can also vary from the upstream side of the media to the downstream side of the media along a gradient. The fibers within the growth media can have a fiber size of at least 10 nm, at least 50 nm, or at least 100 nm. The fibers within the growth media can have a fiber size of up to 500 μm, up to 100 μm, or up to 10 μm.

The angle of the fibers relative to the flow stream in the growth media can be at least 0°, at least 10°, or at least 30°. The angle of the fibers in the growth media can be up to 90°, up to 80°, or up to 60°.

The rigidity of the fibers in the growth media can also have an impact on flow properties and thus can impact coalescence and/or growth. The fibers of the growth media can have a flexural modulus of at least 1 GPa, at least 10 GPa, or at least 50 GPa. The fibers of the growth media can have a flexural modulus of up to 500 GPa, up to 400 GPa, or up to 250 GPa.

The fibers within the growth media can have a surface roughness of at least 1 nm, at least 10 nm, at least 25 nm, at least 50 nm, or at least 100 nm. The fibers within the growth media can have a surface roughness of up to 1000 nm, up to 500 nm, or up to 200 nm. The fibers within the growth media can have skewness of at least −10, at least −8, or at least −6. The skewness of the fibers can be up to 6, up to 8, or up to 10. The fibers within the growth media can have a kurtosis of at least −10, at least −8, or at least −6. The fibers within the growth media can have a kurtosis of up to 6, up to 8, or up to 10. The sharpness or pointedness of surface features can be expressed as the radius of curvature, and be measured using AFM, fiber cross section SEM, or a surface profilometer. The sharpness of the fiber surface features can be up to 2 μm, up to 5 μm, or up to 10 μm.

Pores of the growth media are understood to mean holes (for example through holes) and cavities in the sheet of growth media. Pore size of the growth media can be determined by ASTM F316-03 or ASTM D6767. Pores of the growth media can provide a flow path through the sheet of media for fluid. The growth media can have a mean pore size of at least 0.5 μm, at least 1 μm, or at least 5 μm. The growth media can have a mean pore size of up to 5 μm, up to 10 μm, up to 20 μm, up to 100 μm, or up to 200 μm. The growth media can have a maximum pore size of at least 1 μm, at least 5 μm, or at least 10 μm. The growth media can have a maximum pore size of up to 10 μm, up to 20 μm, up to 100 μm, or up to 200 μm.

The growth media can have at least 5%, at least 10%, or at least 20% void space. The growth media can have up to 90%, up to 75%, up to 50%, up to 40%, or up to 30% void space. For example, the growth media can include woven or nonwoven media with a porous structure.

The growth media sheet can have any suitable thickness. The thickness of the growth media impacts the differential pressure across the media sheet. The thickness of the growth media can be measured in the direction of fluid flow. For example, in a cylindrical deaerator, the growth media forms a coaxial cylinder at least partially surrounding the gas nucleation media and the thickness of the growth media can be measured in a radial direction perpendicular to a center axis A. The thickness can be measured according to TAPPI T411, ASTM D5729, or ASTM D5736. The growth media can have a thickness of at least 0.01 mm, at least 0.02 mm, at least 0.05 mm, at least 0.1 mm, at least 0.5 mm, at least 1 mm, at least 2 mm, at least 3 mm, or at least 4 mm. The growth media can have a thickness of up to 25 mm, up to 20 mm, up to 15 mm, or up to 10 mm.

The growth media sheet can have a differential pressure of at most 0.01 psi, at most 1 psi, or at most 100 psi, per ISO 16889 run at a suitable face velocity.

The growth media can be provided as a plurality of layers of media. The plurality of layers of media can be applied onto (e.g., wrapped around or laminated onto) the gas nucleation media. An increase in the number of layers of the growth media can improve the coalescing of gas cavities. However, an increase in the thickness of the growth media (e.g., due to an in the number of layers of media) can also increase the pressure drop across the growth media and the deaerator as a whole. Therefore, the number of layers of the growth media can be balanced to provide improved coalescing without excessively increasing the pressure drop across the deaerator unit. The growth media can be provided as 2 or more, 3 or more, 4 or more, or 5 or more layers. The growth media can be provided as up to 20, up to 15, up to 12, or up to 10 layers. In embodiments where the growth media includes a plurality of layers, the thickness of the growth media can refer to the total thickness of the layers unless otherwise indicated. The thickness of the individual growth media sheet can influence how many wraps are used—e.g. a thinner media can utilize more wraps. In one embodiment, the growth media is made up of 5-10 layers (e.g., 7 layers) of nonwoven media.

Returning back to FIG. 1A, the primary filtration stage 120 is downstream of the preliminary filtration stage 110 and is configured to receive the filtered fluid stream created by the preliminary filtration stage 110. The primary filtration stage 120 is visible in isolation in FIG. 1C. The primary filtration stage 120 is configured to separate the filtered fluid stream into a first liquid stream 104 and an air cavity concentrate stream 105. A "liquid stream," as used herein, will generally have a lower volume of entrained gas than the upstream fluid stream from which the liquid stream was separated. A "liquid stream" is a fluid stream that is at least 75% liquid and no more than 25% gas by volume, and more commonly at least 90% liquid and no more than 10% gas by volume. Often the liquid stream is at least 95% liquid and no more than 5% gas by volume. The primary filtration stage 120 has a primary fluid inlet 121 downstream of the preliminary filtration stage 110, a primary fluid outlet 122 and a primary liquid outlet 123. The primary fluid inlet 121 is configured to receive the filtered fluid stream from the preliminary filtration stage 110.

The primary filtration stage 120 is configured such that the air cavity concentrate stream 105 passes through the primary fluid outlet 122 and the first liquid stream 104 is configured to pass through the primary liquid outlet 123. The primary liquid outlet 123 can be in communication with a fluid tank 160, such as that depicted with dashed lines in FIG. 1A, which is configured to receive the first liquid stream 104. The first liquid stream 104 can fall into the fluid tank or, in some embodiments a pipe, flow ramp, or spout can be used to direct the first liquid stream 104 into the fluid tank.

The primary filtration stage 120 generally has a primary filter element 127 having primary filter media 124. The primary filter media 124 has an upstream side 125 and a downstream side 126. The primary filter media 124 is configured to accommodate flow of the first liquid stream 104 therethrough from the upstream side 125 to the downstream side 126. In various embodiments, the primary filter media 124 does not accommodate the flow of the air cavity concentrate stream 105 therethrough and, as such, the air cavity concentrate stream 105 circumvents the primary filter media 124. In particular, the primary filtration stage 120 is configured such that the air cavity concentrate stream 105 flows along (or across) the upstream side 125 of the primary filter media 124 without flowing through the primary filter media 124. The air cavity concentrate stream 105 flows axially along the length of the primary filter media 124, generally parallel to the upstream side 125 of the primary filter media 124.

In the current example, the primary filter media 124 extends between a first end 128 and a second end 129. The deaeration system 100 has a housing 130 that is spaced from the upstream side 125 of the primary filter media 124 to define a primary fluid flow path 131 from the first end 128 towards the second end 129. The primary fluid inlet 121 is defined towards the first end 128 of the primary filter media 124 (between the first end 128 of the primary filter media 124 and the housing 130) and the primary fluid outlet 122 is defined on the second end 129 of the primary filter media 124. Each of the primary fluid inlet 121 and the primary fluid outlet 122 are on the upstream side 125 of the primary filter media 124. The primary fluid outlet 122 extends outward from the upstream side 125 of the primary filter media 124. In particular, the primary fluid outlet 122 is defined by an opening between the housing 130 and the second endcap 133 of the primary filter element 127.

In various embodiments, the filtered fluid stream enters the primary filtration stage 120 through the primary fluid inlet 121 on the first end 128 and travels along the primary fluid flow path 131 towards the second end 129 of the primary filter media 124. The primary filter media 124 is configured such that a portion of the liquid within the filtered fluid stream passes through the primary filter media 124 to the primary liquid outlet 123, where the primary liquid outlet 123 extends outward from the downstream side 126 of the primary filter media 124. Air cavities within the filtered fluid stream do not pass through the primary filter media 124. The deaeration system 100 is generally configured such that the filtered fluid stream sweeps along/across the upstream side 125 to prevent the air cavities from clinging to the primary filter media 124 to obstruct liquid flow through the primary filter media 124. As such, the first liquid stream 104 passes through the primary filter media 124 separating from the air cavity concentrate stream 105 on the upstream side 125 of the primary filter media 124. The first liquid stream 104 then exits the deaeration system 100 through the primary liquid outlet 123 and the air cavity concentrate stream 105 then exits the deaeration system 100 through the primary fluid outlet 122.

Under normal operating conditions, the air cavity concentrate stream 105 can constitute up to 35% of the filtered fluid stream by volume. Accordingly, the first liquid stream 104 can constitute at least 65% of the filtered fluid stream by volume. Under normal operating conditions, the air cavity concentrate stream 105 can constitute at least 5% of the filtered fluid stream by volume. Accordingly, the first liquid stream 104 can constitute up to 95% of the filtered fluid stream by volume. "Normal operating conditions" refers to when the temperature of the hydraulic oil has reached a stable level with an idle engine state, such as 140° F. Upon initial start-up, the fluid in hydraulic system can be relatively cold and relatively viscous until the system heats up to normal operating conditions.

The primary filter media 124 can have a variety of configurations. The primary filter media 124 generally lacks a membrane. In the current example, the primary filter media 124 is arranged in a tubular configuration such that the downstream side 126 defines a central passageway extending from the first end 128 to the second end 129. A first endcap 132 is coupled to the first end 128 of the primary filter media 124 and a second endcap 133 is coupled to the second end 129 of the primary filter media 124. The first endcap 132 extends across the central passageway, while the second endcap 133 defines an opening 134 in communication with the central passageway that is the primary liquid outlet 123. While the second end structure 135 and the first endcap 132 are depicted as separate components, in some embodiments the second end structure 135 and the first endcap 132 form a single, unitary component.

In various embodiments, the primary filter media 124 has a porous barrier media, which is described in more detail below. The porous barrier media can form a layer. The porous barrier media can be a pleated screen. In such embodiments, the primary filter media 124 can be abutted by one or more support screens that are configured to maintain the pleated arrangement of the primary filter media 124. In an example, the primary filter media 124 is a porous barrier media that is sandwiched by two support screens. Such support screens, if used, generally do not impact deaeration performance of the primary filter media 124. The porous barrier media of the primary filter media 124 can have a pore size in the range of 10 µm-200 µm, where the pore size can be the average size of the openings of a screen forming the porous barrier media. The porous barrier media can have a pore size in the range of 20 µm-60 µm, 30 µm-50 µm, 50 µm-90 µm, 70 µm-80 µm, or even 100 µm-160 µm. In one example, the primary filter media 124 is a porous barrier media that is a screen having screen openings of about 44 µm.

Porous Barrier Media Construction and Materials

The porous barrier media can have any suitable porous material defining openings or pores extending through the media. Without wishing to be bound by theory, it is believed that multiple aspects of the porous barrier media affect the effectiveness and efficiency of the media. For example, aspects that influence the efficiency of the porous barrier media can include pore size and pore shape, and regularity or uniformity of pore size and shape throughout the media; chemical composition of the media; oleophilicity/oleophobicity of the media; surface roughness or smoothness of the media; and the direction/orientation of the media relative to the direction of flow. One or more of these properties can be different on the upstream side than the downstream side or exhibit a gradient from the upstream side to the downstream side.

In some embodiments, the porous barrier media includes woven or nonwoven material. The openings can be uniformly sized or nonuniform, including openings of various sizes. The pores of the porous barrier media can also be referred to as screen openings and are understood to mean holes (for example through holes) in the media. Pore size of the porous barrier media can be determined by ASTM E11 or by optical imaging. The porous barrier media can include openings sized 5 µm or greater, 10 µm or greater, 15 µm or greater, or 20 µm or greater. The porous barrier media can include openings sized 1 mm or smaller, 750 µm or smaller, 500 µm or smaller, 250 µm or smaller, 200 µm or smaller, 150 µm or smaller, or 100 µm or smaller. In one example, the porous barrier media includes openings sized from 10 µm to 120 µm, from 15 µm to 100 µm, or from 20 µm to 80 µm. In some embodiments, the openings of the porous barrier media are uniform in size (e.g., have a narrow pore size distribution). For example, in some embodiments, at least some openings, a majority of openings, at least 90% of openings, at least 95% of openings, or at least 99% of openings of the porous barrier media are within the size ranges specified here, as determined by total opening area of the porous barrier media. In one embodiment, all of the openings of the porous barrier media are within the size ranges specified here.

The openings of the porous barrier media can have any suitable shape. For example, the openings can be rectangular, square, round, oval, or any other suitable shape. The shape can be determined by viewing the porous barrier media from a direction perpendicular to the plane of the porous barrier media. In some embodiments, the openings of the porous barrier media are uniform in shape. For example, in some embodiments, at least some openings, a majority of openings, at least 90% of openings, at least 95% of openings, or at least 99% of openings of the porous barrier media have the same shape (e.g., are rectangular, square, round, oval, etc.).

The porous barrier media 124 can be made of a woven or non-woven material. For example, the porous barrier media 124 can be made of a woven mesh. The woven mesh can have a wire diameter (or cross dimension) of at least 0.01 mm, at least 0.05 mm or at least 0.1 mm. The woven mesh can have a wire diameter (or cross dimension) of up to 10 mm, up to 2 mm, up to 1 mm, or up to 0.5 mm. In one embodiment, the porous barrier media 124 includes a pleated material, such as a pleated woven mesh. The porous barrier media 124 can be made of any suitable material. For example, the porous barrier media can be made of a material with suitable oleophilicity/oleophobicity to encourage further growth of gas cavities and to allow gas cavities to pass through the media. In some embodiments, the porous barrier media or a part of the porous barrier media is oleophobic. According to some embodiments, at least one side of the porous barrier media is oleophilic. In some embodiments, the porous barrier media exhibits an oleophobicity gradient, where the upstream side of the media is more oleophobic than the downstream side. Oleophobicity of a material can be expressed as an oil rating measured according to AATCC TM118. The porous barrier media can have an oil rating of at least 1, at least 1.5, or at least 2. The porous barrier media can have an oil rating of up to 10, up to 8, or up to 6.

For example, the porous barrier media can be made of metal, such as stainless steel, or woven or non-woven media made from one or more of cellulose; regenerated cellulose (e.g., rayon); synthetic materials such as polyamide, polyester, polyethersulfone (PES), polypropylene (PP), polyethylene (PE), polytetrafluoroethylene (PTFE), polyvinylidene difluoride (PVDF); glass; ceramic; or carbon fiber. In one embodiment, the porous barrier media 124 is made from a woven metallic mesh, such as stainless steel mesh. In some embodiments, the fibers (for example metallic fibers) are coated. Polymeric or non-polymeric coatings, such as resins, can be used. The porous barrier media 124 can be arranged in a cylindrical shape.

The porous barrier media can exhibit microtexture and macrotexture. Microtexture is used here to refer to the surface texture of the media at the level of individual fibers or wires that make up the media (e.g., referring to variations smaller than 1 mm in size). Microtexture can also be referred to as surface roughness. Macrotexture is used here to refer to the surface texture of the media overall (e.g., referring to variations greater than 1 mm in size). The porous barrier media can exhibit surface roughness. For example, porous barrier media can have a surface roughness of at least 1 nm, at least 10 nm, at least 25 nm, at least 50 nm, or at least 100 nm. The porous barrier media can have a surface roughness of up to 1000 nm, up to 500 nm, or up to 200 nm. In some embodiments, the porous barrier media has little or no macrotexture, i.e., the porous barrier media is "smooth," with the exception that the porous barrier media can be pleated.

Additional characterizations for the porous barrier media surface include skewness, kurtosis, and sharpness or pointedness. The skewness of the fibers can be at least −10, at least −8, or at least −6. The skewness of the fibers can be up to 6, up to 8, or up to 10. The fibers of the porous barrier media can have a kurtosis of at least −10, at least −8, or at least −6. The fibers of the porous barrier media can have a kurtosis of up to 6, up to 8, or up to 10. Combinations of certain surface roughness, skewness, and kurtosis can result in favorable capture properties. For example, high roughness and high kurtosis can be beneficial to capture. The fibers of the porous barrier media can have a radius of curvature can be up to 2 nm, up to 5 nm, up to 10, up to 50, up to 100, or up to 500 nm. The porous barrier media can have an initial, clean differential pressure of at most 0.01 psi, at most 1 psi, or at most 100 psi, per ISO 16889 run at a suitable face velocity.

Returning again to FIG. 1A, in some embodiments, the primary filtration stage 120 has primary filter media 124 that is limited to a porous barrier media alone. In such embodiments, there can be one or more layers of porous barrier media. In some embodiments, the primary filter media 124 has a layer of porous barrier media and a layer of growth media, where growth media is discussed in detail above. In some such embodiments, the layer of porous barrier media is positioned downstream of the layer of growth media. In some such embodiments, the layer of porous barrier media is positioned upstream of the layer of growth media. In some embodiments, the primary filter media 124 has a layer of gas nucleation media, which is described in detail above. The layer of gas nucleation media can be positioned upstream of the porous barrier media. In embodiments also incorporating growth media, the layer of gas nucleation media can be positioned upstream of the growth media and the growth media can be positioned upstream of the porous barrier media. Each of the layers of media incorporated in the primary filter media 124 can be in direct contact or, in some embodiments, a gap can be formed between adjacent layers.

The secondary filtration stage 140 is generally configured to receive the air cavity concentrate stream 105 from the primary filtration stage 120 and separate the air cavity concentrate stream 105 into a second liquid stream 106 and a gas stream 107. The secondary filtration stage 140 is depicted in isolation in FIG. 1D. The secondary filtration stage 140 can have a secondary filter element 143 having secondary filter media 142. The secondary filter media 142 extends from a third end 146 to a fourth end 147 and has an upstream surface 144 and a downstream surface 145. The third end 146 of the secondary filter media 142 is coupled to a base 141 and the fourth end 147 of the secondary filter media 142 is coupled to an open endcap 156.

The secondary filtration stage 140 is configured to receive the air cavity concentrate stream 105 through a secondary fluid inlet 149 that, in the current embodiment, is the primary fluid outlet 122 of the primary filtration stage 120. The secondary fluid inlet 149 is towards the third end 146 of the secondary filter media 142. The second liquid stream 106 exits the secondary filtration stage 140 through a secondary liquid outlet 145 that is the downstream surface 145 of the secondary filter media 142. In various embodiments, the second liquid stream 106 is configured to flow into a fluid tank, similar to the first liquid stream 104. The second liquid stream 106 can fall into the fluid tank or, in some embodiments a pipe, flow ramp, or spout can be used to direct the second liquid stream 106 into the fluid tank.

The gas stream 107 exits the secondary filtration stage 140 through a gas outlet 148 towards the fourth end 147 of the secondary filter media 142. In various embodiments, the gas stream 107 can be in open communication with the ambient environment, such as the ambient environment within the hydraulic system containing the deaeration system 100. The ambient environment within the hydraulic system can be at atmospheric conditions, or pressurized, which is discussed below. In some embodiments, the gas stream 107 can be released into the atmosphere.

In the current example, the secondary filtration stage 140 can be considered a settling tank where the air cavity concentrate stream 105 rests under ambient conditions to naturally separate the second liquid stream 106 and the gas stream 107. Where the deaeration system 100 is contained in a fluid tank, hydraulic system, or other containing system, the ambient pressure can be at atmospheric pressure or higher. Where the ambient pressure is atmospheric pressure, the second liquid stream 106 and the gas stream 107 separate under the atmospheric pressure. The second liquid stream 106 and the gas stream 107 are separated absent use of a vacuum pump. The second liquid stream 106 is directed into the fluid tank through the secondary filter media 142, at least in part, under the force of gravity. Where the ambient pressure is higher than atmospheric pressure, the second liquid stream 106 and the gas stream 107 separate under the force of gravity and the pressure inside the tank. The pressure inside the tank can generally be less than 10 psi (69.0 KPa) or less than 5 psi (34.5 KPa) above atmospheric pressure. In some embodiments the pressure inside the tank can be about 7.25 psi (50.0 KPa) above atmospheric pressure. The fluid flow from the secondary fluid inlet 149 to the secondary liquid outlet 145 through the secondary filter media 142 is gravity-driven, at least in part, in multiple embodiments. The fluid flow from the secondary fluid inlet 149 to the gas outlet 148 is gravity-driven, in multiple embodiments.

In the current example, the secondary filtration stage 140 has the base 141 that is substantially impermeable, and a sidewall constructed of secondary filter media 142. While, in the current embodiment, the base 141 and the second endcap 133 of the primary filter element 127 are depicted as forming a single, unitary structure, in some other embodiments the base 141 and the second endcap 133 can be separate components.

In examples consistent with the current embodiment, the secondary filter media 142 is arranged in a tubular configuration defining a cavity 150. The primary filtration stage 120 is contained within the cavity 150 of the secondary filter media 142. In particular, the primary filter element 127 and the housing 130 are contained in the cavity 150 of the secondary filter media 142. In some alternate embodiments, the secondary filtration stage 140 does not surround the primary filtration stage 120. For example, in some embodiments a tube or fluid connector can extend to the secondary filtration stage 140 from the primary filtration stage 120. The secondary filter media 142 is constructed of materials generally consistent with the description above relevant to the primary filter media 124. Although in any particular system 100, the secondary filter media 142 can be constructed of different materials and/or combinations of materials than the primary filter media 124.

Figure 3:
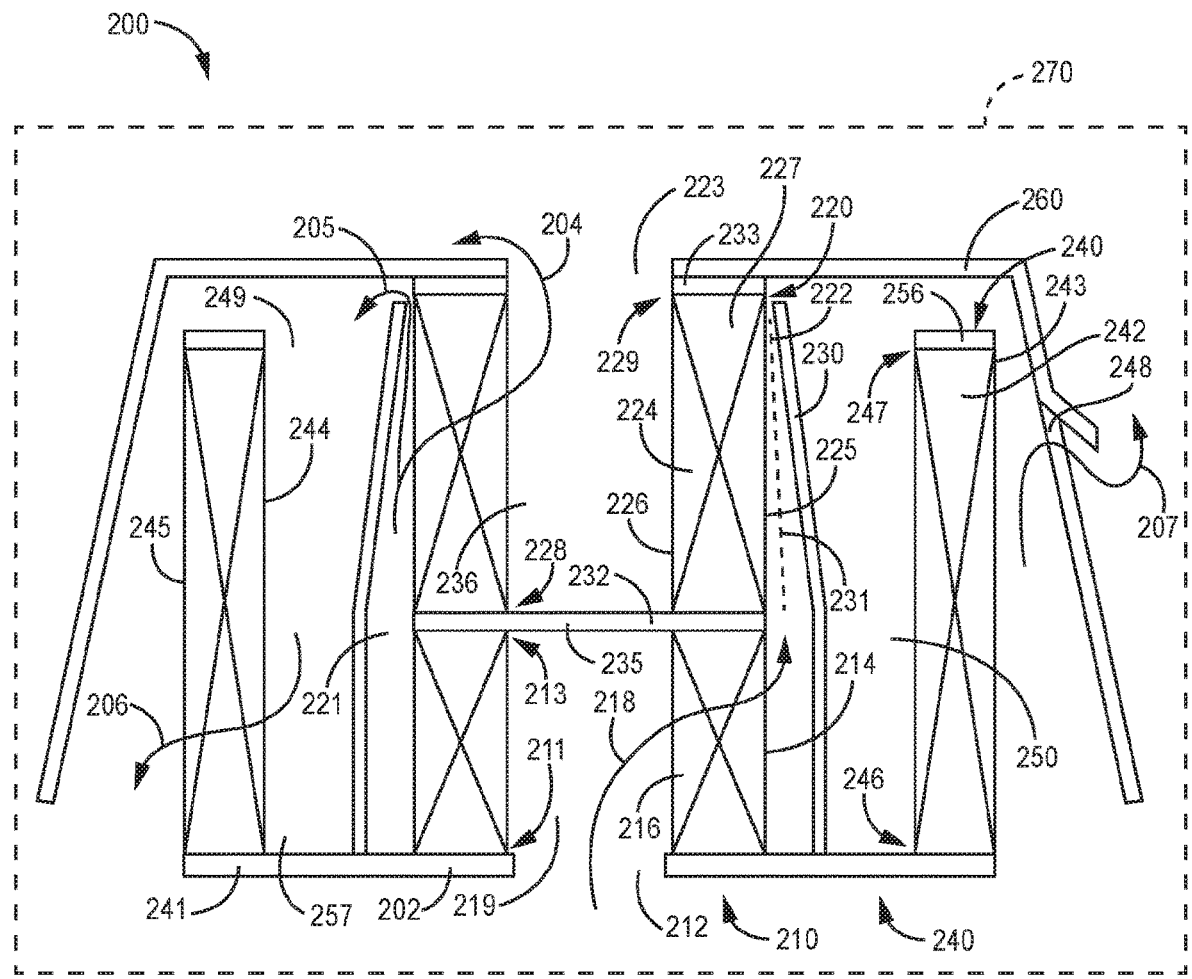
FIG. 3 is another example system consistent with some embodiments.

While the system 100 is currently shown with a preliminary filtration stage 110, in some embodiments, the preliminary filtration stage 110 can be omitted or can be a component of an upstream system. In such embodiments a conduit can fluidly couple the primary fluid outlet to the primary fluid inlet such that the preliminary filtration stage 110 is indirectly coupled to the primary filtration stage 120. In some embodiments, such as that currently depicted, the preliminary filtration stage 110 is directly coupled to the primary filtration stage 120. In the current embodiment, the preliminary filtration stage 110 is positioned above the first end 128 of the primary filter media 124 and, therefore, above the primary fluid inlet 121. FIG. 3, which is described below, depicts another example where a preliminary filtration stage is positioned below a second end of the primary filter media.

In the current example, the housing 130 defines a portion of the preliminary filtration stage 110 and the primary filtration stage 120. In particular, the housing 130 is coupled to the first end structure 102 about the preliminary filter media 116 and extends in an axial direction about the preliminary filter media 116 and the primary filter media 124. The portion of the housing 130 about the preliminary filter media 116 is generally parallel with the outer boundary 115 of the preliminary filter media 116. The portion of the housing 130 about the primary filter media 124 generally tapers towards the second end 129 of the primary filter media 124. In the current example, the housing 130 tapers radially inward towards the second end 129 of the primary filter media 124. Such a configuration can facilitate passage of liquid through the primary filter media 124. In some other embodiments, the housing does not taper relative to the primary filter media 124.

The housing 130 is generally constructed of a liquid impermeable material. In some embodiments the housing 130 is plastic, and in some other embodiments the housing 130 is metal. The housing 130 can be a molded or machined material. In some embodiments the housing 130 forms a single, unitary structure with the first end structure 102, and in other embodiments the housing 130 is a separate component that is sealably coupled to the first end structure 102.

The housing 130 also forms a portion of the secondary filtration stage 140. In particular, the housing 130 is disposed within the cavity 150 of the secondary filter element 143 and forms an inner substantially cylindrical containment wall that, with the secondary filter media 142 and the base 141, cumulatively defines a settling region 157 in the cavity 150. During operation, pressure resulting from fluid flow of the air cavity concentrate stream 105 out of the primary fluid outlet 122 keeps the air cavity concentrate stream 105 in the settling region 157 to separate.

Figure 2:
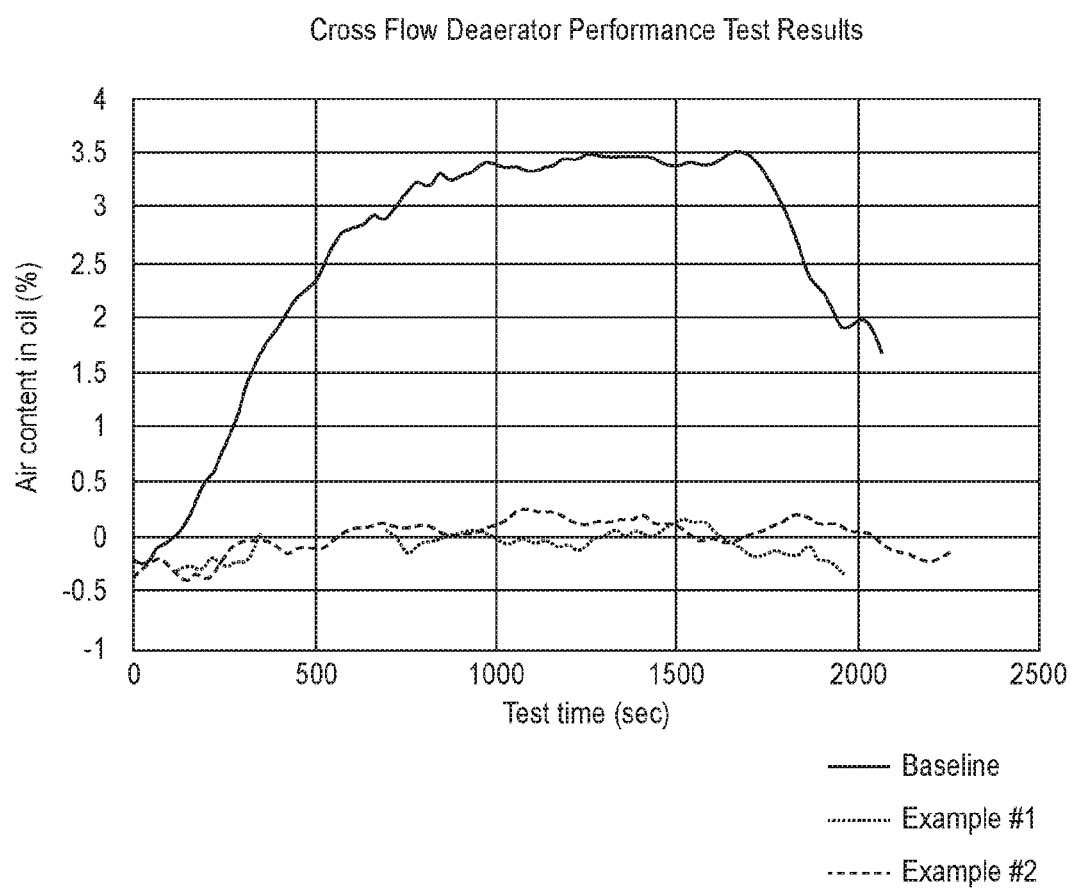
FIG. 2 is a graph of comparative performance test results of an example system.

FIG. 2 depicts two test results (Example #1 and Example #2) for an example system consistent with FIG. 1A compared to a commercially available deaerator system that is a standard synthetic pleated filter element used as a baseline measurement ("Baseline"). The baseline pleated filter element was constructed of pleated synthetic filter media arranged around a central axis to form a tubular structure and was configured for radially outward fluid flow through the synthetic filter media from a central opening of the tubular structure. In the example system consistent with FIG. 1A, the preliminary filter media was limited to a layer of gas nucleation media, the primary filter media was limited to a porous barrier media layer, and the secondary filter media was limited to another porous barrier media layer. Each of the porous barrier media layers were sandwiched between support screens.

The deaerator systems were assembled in a tank constructed to simulate the hydraulic oil tank in a hydraulic system, where return hydraulic oil enters the tank and the deaerator from the top. During testing, the ambient pressure of the tank was equal to atmospheric pressure. Hydraulic oil was fed into the tank and was continuously aerated for 1800 seconds. Air content in oil (%) was measured and recorded throughout the test. A lower percentage for the air content in oil indicates more air removed and thus better deaeration performance. As is visible in FIG. 2, the system consistent with the technology disclosed herein had clearly better performance than the baseline element, meaning that the currently-disclosed system was more effective at deaerating the hydraulic fluid. It is noted that the data associated with Example #1 from about 350 seconds to about 690 seconds is omitted here due to inaccuracies within that time period resulting from an error in execution while running the experiment.

FIG. 3 is an example deaeration system 200 consistent with various embodiments. The deaeration system 200 is generally configured to remove entrained air from a fluid stream. The deaeration system 200 generally has a preliminary filtration stage 210, a primary filtration stage 220, and a secondary filtration stage 240.

The preliminary filtration stage 210 is generally configured to filter particulates from a fluid stream. The preliminary filtration stage 210 is also configured to nucleate gas in the fluid stream. The preliminary filtration stage 210 has an inlet 212 that receives the fluid stream and an outlet 214 that releases a filtered fluid stream created by the preliminary filtration stage 210.

The preliminary filtration stage 210 has a preliminary filter media 216 and defines a preliminary fluid flow path 218 from the inlet 212 to the outlet 214 and into and through the preliminary filter media 216. In particular, in the current example, the preliminary filtration stage 210 has preliminary filter media 216 surrounding a central opening 219 that is in fluid communication with the inlet 212. A first end structure 202 defines the inlet 212. The first end structure 202 is coupled to a first end 211 of the preliminary filter media 216. A second end structure 235 is coupled to a second end 213 of the preliminary filter media 216 and extends across the central opening 219 such that the preliminary fluid flow path 218 extends through the preliminary filter media 216. In the current embodiment, the outlet 214 of the preliminary filter media 216 can be an outer boundary 215 of the preliminary filter media 216. The materials and construction of the preliminary filter media 216 can be generally consistent with the discussion above with respect to FIG. 1A.

The primary filtration stage 220 is downstream of the preliminary filtration stage 210 and is configured to receive the filtered fluid stream created by the preliminary filtration stage 210. The primary filtration stage 220 is configured to separate the filtered fluid stream into a first liquid stream 204 and an air cavity concentrate stream 205. The primary filtration stage 220 has a primary fluid inlet 221 downstream of the preliminary filtration stage 210, a primary fluid outlet 222 and a primary liquid outlet 223. The primary fluid inlet 221 is configured to receive the filtered fluid stream from the preliminary filtration stage 210. The primary filtration stage 220 is configured such that the air cavity concentrate stream 205 passes through the primary fluid outlet 222 and the first liquid stream 204 is configured to pass through the primary liquid outlet 223. The primary liquid outlet 223 can be in communication with a fluid tank 270 that is configured to receive the first liquid stream 204. The fluid tank 270 is represented schematically in FIG. 3 with dashed lines.

In the current embodiment, a fluid flow ramp 260 is coupled to the second endcap 233 about the primary liquid outlet 223. The fluid flow ramp 260 is configured to direct the first liquid stream 204 to the fluid tank 270. In some embodiments the fluid flow ramp 260 forms a single, unitary structure with the second endcap 233 but in other embodiments the fluid flow ramp 260 is a separate component that is coupled to the second endcap 233. The fluid flow ramp 260 extends radially outward from the second endcap 233 and also extends downward to allow gravity-assisted flow of the first liquid stream 204 to the fluid tank. In some embodiments a flow pipe can be in fluid communication with the primary liquid outlet to direct liquid flow to the fluid tank.

The primary filtration stage 220 generally has a primary filter element 227 having primary filter media 224. The primary filter media 224 has an upstream side 225 and a downstream side 226. The primary filter media 224 is configured to accommodate flow of the first liquid stream 204 therethrough from the upstream side 225 to the downstream side 226. In various embodiments, the primary filter media 224 does not accommodate the flow of the air cavity concentrate stream 205 therethrough and, as such, the air cavity concentrate stream 205 circumvents the primary filter media 224. In particular, the primary filtration stage 220 is configured such that the air cavity concentrate stream 205 flows along the upstream side 225 of the primary filter media 224 without flowing through the primary filter media 224.

In the current example, the primary filter media 224 extends between a first end 228 and a second end 229. The deaeration system 200 has a housing 230 that is spaced from the upstream side 225 of the primary filter media 224 to define a primary fluid flow path 231 from the first end 228 towards the second end 229. The primary fluid inlet 221 is defined towards the first end 228 of the primary filter media 224 (between the first end 228 of the primary filter media 224 and the housing 230) and the primary fluid outlet 222 is defined on the second end 229 of the primary filter media 224. Each of the primary fluid inlet 221 and the primary fluid outlet 222 are on the upstream side 225 of the primary filter media 224. The primary fluid outlet 222 extends outward from the upstream side 225 of the primary filter media 224. In particular, the primary fluid outlet 222 is defined by an opening between the housing 230 and the second end 229 of the primary filter media 224.

In various embodiments, the filtered fluid stream enters the primary filtration stage 220 through the primary fluid inlet 221 on the first end 228 and travels along the primary fluid flow path 231 towards the second end 229 of the primary filter media 224. The primary filter media 224 is configured such that a portion of the liquid within the filtered fluid stream passes through the primary filter media 224 to the primary liquid outlet 223, where the primary liquid outlet 223 extends outward from the downstream side 226 of the primary filter media 224. Air cavities within the filtered fluid stream do not pass through the primary filter media 224. The deaeration system 200 is generally configured such that the filtered fluid stream sweeps across the upstream side 225 to prevent the air cavities from obstructing liquid flow through the primary filter media 224. As such, the first liquid stream 204 passes through the primary filter media 224 separating from the air cavity concentrate stream 205 on the upstream side 225 of the primary filter media 224. The first liquid stream 204 then exits the deaeration system 200 through the primary liquid outlet 223 and the air cavity concentrate stream 205 then exits the deaeration system 200 through the primary fluid outlet 222.

Under normal operating conditions, the air cavity concentrate stream 205 can constitute up to 35% of the filtered fluid stream by volume. Accordingly, the first liquid stream 204 can constitute at least 65% of the filtered fluid stream by volume. Under normal operating conditions, the air cavity concentrate stream 205 can constitute at least 5% of the filtered fluid stream by volume. Accordingly, the first liquid stream 204 can constitute up to 95% of the filtered fluid stream by volume.

The primary filter media 224 can generally be consistent with the discussion above of the primary filter media 124 with reference to FIGS. 1A and 1B. The primary filter media 224 generally lacks a membrane. In the current example, the primary filter media 224 is arranged in a tubular configuration such that the downstream side 226 defines a central passageway 236 extending from the first end 228 to the second end 229. A first endcap 232 is coupled to the first end 228 of the primary filter media 224 and a second endcap 233 is coupled to the second end 229 of the primary filter media 224. The first endcap 232 extends across the central passageway, while the second endcap 233 defines an opening 234 in communication with the central passageway that is the primary liquid outlet 223. In the current example, the first endcap 232 and the second end structure 235 are a single, unitary component, but other configurations are possible.

In various embodiments, the primary filter media 224 is formed from a pleated screen. In such embodiments, the primary filter media 224 can be abutted by one or more support screens that are configured to maintain the pleated arrangement of the primary filter media 224. In an example, the primary filter media 224 is sandwiched by two support screens. Such support screens, if used, generally do not impact deaeration performance of the primary filter media 224. The primary filter media 224 can have a pore size in the range of 20-200 μm, where the pore size can be the size of the openings in the screen. The primary filter media 224 can have a pore size in the range of 20-60 μm, 30-50 μm, 50-90 μm, 70-80 μm, or even 100-160 μm. Other materials can be used to construct the primary filter media 224, such as described above with reference to FIGS. 1A and 1B.

The secondary filtration stage 240 is generally configured to receive the air cavity concentrate stream 205 from the primary filtration stage 220 and separate the air cavity concentrate stream 205 into a second liquid stream 206 and a gas stream 207. The secondary filtration stage 240 can have a secondary filter element 243 having secondary filter media 242. The secondary filter media 242 extends from a third end 246 to a fourth end 247 and has an upstream surface 244 and a downstream surface 245. The third end 246 of the secondary filter media 242 is coupled to a base and the fourth end 247 of the secondary filter media 242 is coupled to an open endcap 256.

The secondary filtration stage 240 is configured to receive the air cavity concentrate stream 205 through a secondary fluid inlet 249 that is in fluid communication with the primary fluid outlet 222 of the primary filtration stage 220. The secondary fluid inlet 249 surrounds the primary fluid outlet 222. In this example, the secondary fluid inlet 249 is towards the fourth end 247 of the secondary filter media 242. The second liquid stream 206 exits the secondary filtration stage 240 through a secondary liquid outlet 245 that is the downstream surface 245 of the secondary filter media 242. The gas stream 207 exits the secondary filtration stage 240 through a gas outlet 248. The gas outlet 248 can be defined towards the fourth end 247 of the secondary filter media 242. In the current example the gas outlet 248 can be one or more openings defined by the fluid flow ramp 260. In various embodiments, the secondary filtration stage 240 can be in open communication with the ambient environment, such as the ambient environment within the hydraulic system containing the deaeration system 200. The ambient environment within the hydraulic system can be at atmospheric conditions or pressurized, which is discussed above with reference to FIG. 1A.

In some embodiments, the gas stream 207 can be released into the atmosphere. In various embodiments, the second liquid stream 206 is configured to flow into a fluid tank 270, similar to the first liquid stream 204. The air cavity concentrate stream 205 can rest under ambient conditions to naturally separate the second liquid stream 206 and the gas stream 207. The second liquid stream 206 is directed into the fluid tank 270 through the secondary filter media 242, at least in part, under the force of gravity. Where the ambient pressure is higher than atmospheric pressure, the second liquid stream 206 and the gas stream 207 separate under gravity and also the force of the pressure inside the tank 270. The fluid flow from the secondary fluid inlet 249 to the secondary liquid outlet 245 through the secondary filter media 242 is gravity-driven, at least in part, in multiple embodiments. The fluid flow from the secondary fluid inlet 249 to the gas outlet 248 is gravity-driven, in multiple embodiments.

In the current example, the secondary filtration stage 240 has the base 241 that is substantially impermeable, and a sidewall constructed of secondary filter media 242. While, in the current embodiment, the base 241 and the first end structure 202 of the preliminary filtration stage 210 are depicted as forming a single, unitary structure, in some other embodiments the base 241 and the first end structure 202 can be separate components.

In examples consistent with the current embodiment, the secondary filter media 242 is arranged in a tubular configuration that defines a cavity 250. The primary filtration stage 220 is contained within the cavity 250 of the secondary filter media 242. In particular, the primary filter element 227 and the housing 230 are contained in the cavity 250 of the secondary filter media 242. In some alternate embodiments, the secondary filtration stage 240 does not surround the primary filtration stage 220, which was discussed above with reference to FIGS. 1A and 1D. The secondary filter media 242 can be constructed of materials and have configurations consistently with the discussion above with reference to FIG. 1A.

While the system is currently shown with a preliminary filtration stage 210, in some embodiments, the preliminary filtration stage 210 can be omitted or can be a component of a system upstream of the deaeration system 200. In the current embodiment, the preliminary filtration stage 210 is positioned below the first end 228 of the primary filter media 224 and, therefore, below the primary fluid inlet 221.

In the current example, the housing 230 defines a portion of the preliminary filtration stage 210 and the primary filtration stage 220. In particular, the housing 230 is coupled to the first end structure 202 and the base 241 about the preliminary filter media 216. The housing 230 extends in an axial direction about the preliminary filter media 216 and the primary filter media 224. The portion of the housing 230 about the preliminary filter media 216 is generally parallel with the outer boundary 215 of the preliminary filter media 216. The portion of the housing 230 about the primary filter media 224 generally tapers towards the second end 229 of the primary filter media 224. In the current example, the housing 230 tapers radially inward towards the second end 229 of the primary filter media 224, but in some embodiments the housing 230 does not taper. The housing 230 can be a single, unitary structure with the first end structures 202 and/or the base 241 or the housing 230 can be a separate component. The housing 230 can be constructed of materials consistently with the discussion above with reference to FIG. 1A.

The housing 230 also forms a portion of the secondary filtration stage 240. In particular, the housing 230 is disposed within the cavity 250 of the secondary filter element 243 and forms an inner substantially cylindrical containment wall that, with the secondary filter media 242 and the base 241, cumulatively defines a settling region 257 in the cavity 250 where the air cavity concentrate stream 205 can settle and separate into a second liquid stream 206 and a gas stream 207.

Figure 4:
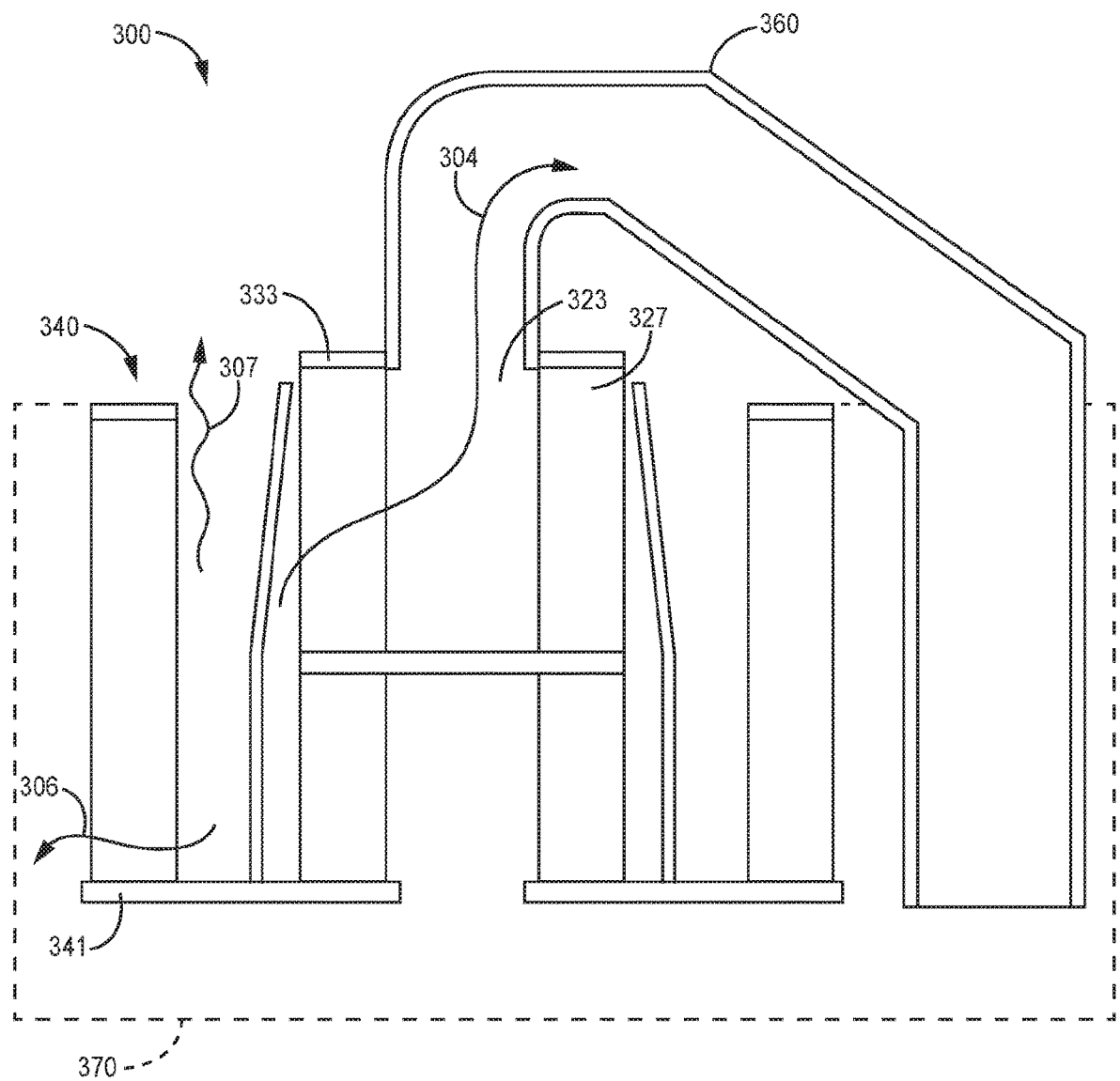
FIG. 4 is another example system consistent with some embodiments.

FIG. 4 depicts yet another example system 300 consistent with some embodiments. The system 300 is generally consistent with that described above with reference to FIG. 3, except here a flow channel 360 is coupled to a second endcap 333 of a primary filter element 327 about a primary liquid outlet 323. The flow channel 360 is configured to extend into a fluid tank 370 to direct a first liquid stream 304 to the fluid tank. A gas stream 307 exiting the secondary filtration stage 340 can be released in a generally upward direction and a second liquid stream 306 exiting the secondary filtration stage 340 is released into the fluid tank. While, in the current example the flow channel 360 is an enclosed, tubular pipe, in some other embodiments the flow channel 360 can be formed by a spout that extends downward towards an interior of the fluid tank. In some embodiments another flow channel such as a ramp, pipe, or spout can extend from a base 341 of the secondary filtration stage 340 towards the interior of the fluid tank.

Figure 5:
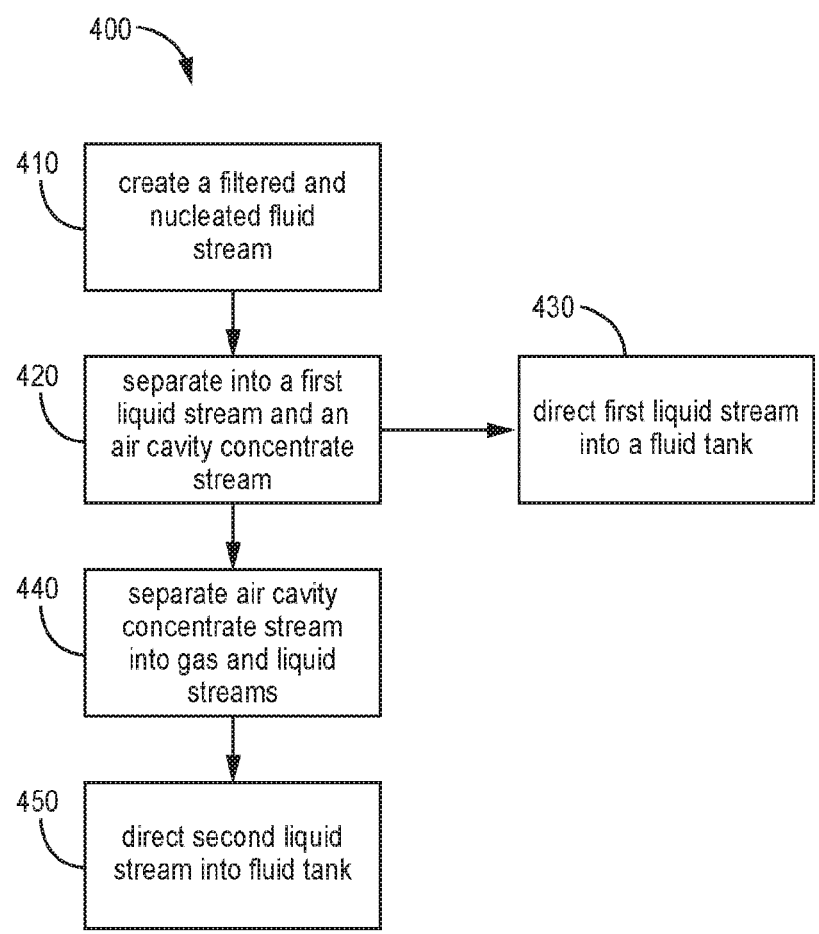
FIG. 5 is a flow chart of an example method consistent with some embodiments.

FIG. 5 is a flow chart of an example method 400 consistent with some embodiments. A filtered and nucleated fluid stream is created 410. The filtered and nucleated fluid stream is separated into a first liquid stream and an air cavity concentrate stream 420. The first liquid is directed into a fluid tank 430. The air cavity concentrate stream is separated into a gas stream and a liquid stream 440. The second liquid is directed into a fluid tank 450.

The filtered and nucleated fluid stream is created 410 by filtering particles and nucleating gas cavities in a fluid stream. Filtering particles and nucleating gas cavities can be achieved in a single step, such as described above with regard to a preliminary filtration stage. In particular, passing the fluid stream through a preliminary filter media can filter particles and nucleate gas cavities in the fluid stream. Filtering particles and nucleating gas cavities can be achieved in multiple steps. For example, in some embodiments particles can be filtered from a fluid stream to create a filtered fluid stream, and the filtered fluid stream can then be passed through nucleation media that nucleates gas cavities in the filtered fluid stream. Other approaches are also contemplated.

The filtered and nucleated fluid stream is separated into a first liquid stream and an air cavity concentrate stream 420. The filtered and nucleated fluid stream can be separated using a primary filtration stage. In some embodiments, the filtered and nucleated fluid stream is swept along an upstream surface of a primary filter media to separate the first liquid stream from the air cavity concentrate stream. The first liquid stream can pass through the primary filter media. The air cavity concentrate stream can circumvent the primary filter media. The primary filter media can be consistent with primary filter media discussed above.

The first liquid stream is directed into a fluid tank 430 through approaches discussed above. In some embodiments the first liquid stream is directed into a fluid tank under the force of gravity. In some embodiments the first liquid stream is directed into a fluid tank through the use of a spout, pipe, flow ramp, or another structure. In some embodiments the first liquid stream falls from a primary liquid outlet into the fluid tank.

The air cavity concentrate stream can be separated into a gas stream and a second liquid stream 450 through a variety of approaches. The air cavity concentrate stream can be directed into a settling tank. The settling tank can be consistent with a secondary filtration stage as discussed herein. Also as discussed above, the settling tank can be constructed of a secondary filter media. In various embodiments, the gas stream and the second liquid stream are separated from the air cavity concentrate stream 450 through the natural release of the gas stream from the air cavity concentrate stream under atmospheric conditions. In various embodiments, the gas stream and the second liquid stream are separated from the air cavity concentrate stream 450 through the natural release of the gas stream from the air cavity concentrate stream under an ambient pressure of less than 10 psi over atmospheric pressure.

The second liquid stream is directed into a fluid tank 450 through approaches discussed above. In some embodiments the second liquid stream is directed into the fluid tank under the force of gravity and ambient pressure. In some embodiments the second liquid stream is directed into a fluid tank through the use of a spout, pipe, flow ramp, or another structure. In some embodiments the second liquid stream falls from a secondary liquid outlet into the fluid tank.

STATEMENT OF THE EXEMPLARY EMBODIMENTS

Embodiment 1. A deaeration system comprising:
a primary filter element having primary filter media extending between a first end and a second end, the primary filter media having an upstream side and a downstream side;
a housing spaced from the upstream side of the primary filter media to define a primary fluid flow path from the first end towards the second end, wherein the system defines a primary fluid inlet between the first end of the primary filter media and the housing, a primary fluid outlet on the second end of the primary filter media extending outward from the upstream side of the primary filter media, and a primary liquid outlet extending outward from the downstream side of the primary filter media; and a secondary filter element having secondary filter media having an upstream surface and a downstream surface, the secondary filter media extending from a third end to a fourth end, wherein the system defines a secondary fluid inlet that is the primary fluid outlet, a secondary liquid outlet that is the downstream surface of the secondary filter media, and a gas outlet on the fourth end, wherein the secondary fluid inlet is towards the third end.

Embodiment 2. The system of any one of embodiments 1 and 3-12, wherein the housing tapers towards the second end of the primary filter media.

Embodiment 3. The system of any one of embodiments 1-2 and 4-12, wherein the first end is configured to be positioned above the second end.

Embodiment 4. The system of any one of embodiments 1-3 and 5-12, wherein the first end is configured to be positioned below the second end.

Embodiment 5. The system of any one of embodiments 1-4 and 6-12, wherein the primary filter media lacks a membrane.

Embodiment 6. The system of any one of embodiments 1-5 and 7-12, wherein the primary filter media has porous barrier media defining a pore size range of 10 µm-200 µm.

Embodiment 7. The system of any one of embodiments 1-6 and 8-12, wherein the primary filter media is arranged in a tubular configuration wherein the downstream side defines a central passageway extending from the first end to the second end.

Embodiment 8. The system of any one of embodiments 1-7 and 9-12, wherein the secondary filter media is arranged in a tubular configuration that defines a cavity, and the primary filter element and the housing are disposed in the cavity.

Embodiment 9. The system of any one of embodiments 1-8 and 10-12, further comprising a preliminary filtration stage upstream of the primary fluid inlet, wherein the preliminary filtration stage comprises a preliminary filter media and defines a preliminary fluid flow path into and through the preliminary filter media to the primary fluid inlet.

Embodiment 10. The system of any one of embodiments 1-9 and 11-12, wherein the preliminary filter media is positioned vertically above the primary fluid inlet.

Embodiment 11. The system of any one of embodiments 1-10 and 12, wherein fluid flow from the secondary fluid inlet to the secondary liquid outlet is gravity-driven.

Embodiment 12. The system of any one of embodiments 1-11, wherein the fluid flow path from the secondary fluid inlet to the gas outlet is gravity-driven.

Embodiment 13. A deaeration system comprising: a preliminary filtration stage configured to filter particles from and nucleate gas in a fluid stream to create a filtered fluid stream; a primary filtration stage downstream of the preliminary filtration stage configured to separate the filtered fluid stream into a first liquid stream and an air cavity concentrate stream; and a secondary filtration stage configured to receive the air cavity concentrate stream and separate the air cavity concentrate stream into a second liquid stream and a gas stream.

Embodiment 14. The deaeration system any one of embodiments 13 and 15-23, wherein the gas stream is in open communication with the ambient environment.

Embodiment 15. The deaeration system of any one of embodiments 13-14 and 16-23, wherein the secondary filtration stage is a settling tank in open communication with the ambient environment.

Embodiment 16. The deaeration system of any one of embodiments 13-15 and 17-23, wherein the settling tank has an impermeable base and a sidewall constructed of secondary filter media.

Embodiment 17. The deaeration system of any one of embodiments 13-16 and 18-23, wherein the first liquid stream and the second liquid stream are configured to flow into a fluid tank.

Embodiment 18. The deaeration system of any one of embodiments 13-17 and 19-23, wherein the primary filtration stage comprises primary filter media and the first liquid stream is configured to pass through the primary filter media.

Embodiment 19. The deaeration system of any one of embodiments 13-18 and 20-23, wherein the air cavity concentrate stream is configured to circumvent the primary filter media.

Embodiment 20. The deaeration system of any one of embodiments 13-19 and 21-23, wherein the primary filter media has an upstream side and a downstream side, and the air cavity concentrate stream is configured to flow along the upstream side.

Embodiment 21. The deaeration system of any one of embodiments 13-20 and 22-23, wherein the primary filter media comprises a pleated screen.

Embodiment 22. The deaeration system of any one of embodiments 13-21 and 23, wherein the air cavity concentrate stream is configured to constitute up to 35% of the filtered fluid stream by volume.

Embodiment 23. The deaeration system of any one of embodiments 13-22, wherein the air cavity concentrate stream is configured to constitute at least 5% of the filtered fluid stream by volume.

Embodiment 24. A method comprising:
  filtering particles and nucleating gas cavities in a fluid stream to create a filtered and nucleated fluid stream;
  separating the filtered and nucleated fluid stream into a first liquid stream and an air cavity concentrate stream;
  directing the first liquid stream into a fluid tank;
  separating the air cavity concentrate stream into a gas stream and a second liquid stream; and
  directing the second liquid stream into the fluid tank.

Embodiment 25. The method of any one of embodiments 24 and 26-33, wherein separating the air cavity concentrate stream comprises directing the air cavity concentrate stream into a settling tank, wherein the settling tank is under atmospheric pressure.

Embodiment 26. The method of any one of embodiments 24-25 and 27-33, wherein directing the second liquid stream into the fluid tank is gravity-driven through a sidewall of the settling tank that is constructed of secondary filter media.

Embodiment 27. The method of any one of embodiments 24-26 and 28-33, wherein separating the gas stream from the air cavity concentrate stream comprises natural release of the gas stream under atmospheric conditions.

Embodiment 28. The method of any one of embodiments 24-27 and 29-33, wherein the separating the air cavity concentrate stream comprises directing the air cavity concentrate stream into a settling tank, wherein the settling tank is under pressure of less than 10 psi.

Embodiment 29. The method of any one of embodiments 24-28 and 30-33, wherein separating the filtered and nucleated fluid stream comprises passing the filtered and nucleated fluid stream along an upstream surface of a primary filter media.

Embodiment 30. The method of any one of embodiments 24-29 and 31-33, wherein the first liquid stream passes through the primary filter media.

Embodiment 31. The method of any one of embodiments 24-30 and 32-33, wherein the air cavity concentrate stream circumvents the primary filter media.

Embodiment 32. The method of any one of embodiments 24-31 and 33, wherein the primary filter media comprises a pleated screen.

Embodiment 33. The method of any one of embodiments 24-32, wherein filtering particles and nucleating gas cavities comprises passing the fluid stream through a preliminary filter media.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A deaeration system comprising:
   a primary filter element having primary filter media extending between a first end and a second end, the primary filter media having an upstream side and a downstream side;
   a housing spaced from the upstream side of the primary filter media to define a primary fluid flow path from the first end towards the second end, wherein the system defines a primary fluid inlet between the first end of the primary filter media and the housing, a primary fluid outlet on the second end of the primary filter media extending outward from the upstream side of the primary filter media, and a primary liquid outlet extending from the downstream side of the primary filter media; and
   a secondary filter element having secondary filter media having an upstream surface and a downstream surface, the secondary filter media extending from a third end to a fourth end, wherein the system defines a secondary fluid inlet that is the primary fluid outlet, a secondary liquid outlet that is the downstream surface of the secondary filter media, and a gas outlet on the fourth end, wherein the secondary fluid inlet is towards the third end.

2. The system of claim 1, wherein the housing tapers towards the second end of the primary filter media.

3. The system of claim 1, wherein the first end is configured to be positioned above the second end.

4. The system of claim 1, wherein the first end is configured to be positioned below the second end.

5. The system of claim 1, wherein the primary filter media lacks a membrane.

6. The system of claim 1, wherein the primary filter media has porous barrier media defining a pore size range of 10 µm-200 µm.

7. The system of claim 1, wherein the primary filter media is arranged in a tubular configuration, wherein the downstream side defines a central passageway extending from the first end to the second end.

8. The system of claim 1, wherein the secondary filter media is arranged in a tubular configuration that defines a cavity, and the primary filter element and the housing are disposed in the cavity.

9. The system of claim 1, further comprising a preliminary filtration stage upstream of the primary fluid inlet, wherein the preliminary filtration stage comprises a preliminary filter media and defines a preliminary fluid flow path into and through the preliminary filter media to the primary fluid inlet.

10. The system of claim 9, wherein the preliminary filter media is positioned vertically above the primary fluid inlet.

11. The system of claim 1, wherein fluid flow from the secondary fluid inlet to the secondary liquid outlet is gravity-driven.

12. The system of claim 1, wherein fluid flow from the secondary fluid inlet to the gas outlet is gravity-driven.

13. A deaeration system comprising:
    a preliminary filtration stage configured to filter particles from and nucleate gas in a fluid stream to create a filtered fluid stream;
    a primary filtration stage downstream of the preliminary filtration stage configured to separate the filtered fluid stream into a first liquid stream and an air cavity concentrate stream, wherein the primary filtration stage comprises a primary filter element having primary filter media extending between a first end and a second end, the primary filter media having an upstream side and a downstream side;
    a housing spaced from the upstream side of the primary filter media to define a primary fluid flow path from the first end towards the second end, wherein the system defines a primary fluid inlet between the first end of the primary filter media and the housing, a primary fluid outlet on the second end of the primary filter media extending outward from the upstream side of the primary filter media, and a primary liquid outlet extending from the downstream side of the primary filter media; and
    a secondary filtration stage configured to receive the air cavity concentrate stream and separate the air cavity concentrate stream into a second liquid stream and a gas stream, wherein the secondary filtration stage comprises a secondary filter element having secondary filter media having an upstream surface and a downstream surface, the secondary filter media extending from a third end to a fourth end, wherein the system defines a secondary fluid inlet that is the primary fluid outlet, a secondary liquid outlet that is the downstream surface of the secondary filter media, and a gas outlet on the fourth end, wherein the secondary fluid inlet is towards the third end.

14. The deaeration system of claim 13, wherein the gas stream is in open communication with the ambient environment.

15. The deaeration system of claim 13, wherein the secondary filtration stage is a settling tank in open communication with the ambient environment.

16. The deaeration system of claim 15, wherein the settling tank has an impermeable base and a sidewall constructed of the secondary filter media.

17. A method of using a system comprising:
filtering particles and nucleating gas cavities in a fluid stream to create a filtered and nucleated fluid stream;
separating the filtered and nucleated fluid stream into a first liquid stream and an air cavity concentrate stream with a primary filter element having primary filter media extending between a first end and a second end, the primary filter media having an upstream side and a downstream side;
directing the first liquid stream into a fluid tank along a primary fluid flow path defined by a housing spaced from the upstream side of the primary filter media, wherein the primary fluid flow path is from the first end towards the second end, wherein a primary fluid inlet is between the first end of the primary filter media and the housing, a primary fluid outlet is on the second end of the primary filter media extends outward from the upstream side of the primary filter media, and a primary liquid outlet extending from the downstream side of the primary filter media;
separating the air cavity concentrate stream into a gas stream and a second liquid stream with a secondary filter element having secondary filter media having an upstream surface and a downstream surface, the secondary filter media extending from a third end to a fourth end, wherein the system defines a secondary fluid inlet towards the third end that is the primary fluid outlet, a secondary liquid outlet that is the downstream surface of the secondary filter media, and a gas outlet on the fourth end; and
directing the second liquid stream into the fluid tank.

18. The method of claim 17, wherein separating the air cavity concentrate stream comprises directing the air cavity concentrate stream into a settling tank, wherein the settling tank is under atmospheric pressure.

19. The method of claim 18, wherein directing the second liquid stream into the fluid tank is gravity-driven through a sidewall of the settling tank that is constructed of the secondary filter media.

20. The method of claim 17, wherein separating the gas stream from the air cavity concentrate stream comprises natural release of the gas stream under atmospheric conditions.

* * * * *

UNITED STATES PATENT AND TRADEMARK OFFICE
CERTIFICATE OF CORRECTION

PATENT NO. : 12,274,958 B2
APPLICATION NO. : 17/771141
DATED : April 15, 2025
INVENTOR(S) : Mike J. Madsen and Michael J. Cronin Page 1 of 1

It is certified that error appears in the above-identified patent and that said Letters Patent is hereby corrected as shown below:

In the Claims

Column 29 In Claim 17, Line 23, 'media extends' should be -- media extending --.

Column 29 In Claim 17, Line 25, 'outlet extending' should be -- outlet extends --.

Signed and Sealed this
Eighth Day of July, 2025

Coke Morgan Stewart
*Acting Director of the United States Patent and Trademark Office*